(12) United States Patent
Oh et al.

(10) Patent No.: US 10,859,450 B2
(45) Date of Patent: Dec. 8, 2020

(54) STRAIN SENSOR AND METHOD OF FABRICATING THE SAME

(71) Applicant: Korea University Research and Business Foundation, Seoul (KR)

(72) Inventors: Soong Ju Oh, Seoul (KR); Woo Seok Lee, Seoul (KR); Dong Gyu Kim, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/564,198

(22) Filed: Sep. 9, 2019

(65) Prior Publication Data
US 2020/0256748 A1   Aug. 13, 2020

(30) Foreign Application Priority Data
Feb. 7, 2019   (KR) .................. 10-2019-0014455

(51) Int. Cl.
*G01L 1/00*   (2006.01)
*G01L 1/22*   (2006.01)
*G01L 1/18*   (2006.01)

(52) U.S. Cl.
CPC .............. *G01L 1/2287* (2013.01); *G01L 1/18* (2013.01)

(58) Field of Classification Search
CPC ........... G01L 1/18; G01L 1/2297; H01B 1/22; H01M 4/622; H01M 4/624
USPC .................................................... 73/862.627
See application file for complete search history.

(56) References Cited

U.S. PATENT DOCUMENTS

| 7,712,373 | B2 * | 5/2010 | Nagle | A61B 5/1135 73/780 |
| 2006/0232636 | A1 * | 10/2006 | Bengali | B41J 2/14145 347/65 |
| 2006/0250534 | A1 * | 11/2006 | Kutscher | H03K 17/964 349/41 |
| 2008/0118755 | A1 * | 5/2008 | Whiteford | B05D 5/12 428/403 |
| 2008/0302672 | A1 * | 12/2008 | Sandvik | G01N 33/2841 205/775 |
| 2009/0242937 | A1 * | 10/2009 | Marui | H01L 29/7786 257/192 |

(Continued)

FOREIGN PATENT DOCUMENTS

KR   10-2012-0073140 A   7/2012
KR   10-1813074 B1   12/2017
(Continued)

*Primary Examiner* — Max H Noori
(74) *Attorney, Agent, or Firm* — NSIP Law

(57) ABSTRACT

The present disclosure discloses a strain sensor and a method of fabricating the same. The strain sensor according to an embodiment of the present disclosure includes an X-axis sensor formed on a flexible insulating substrate and responsible for sensing X-axis strain; a Y-axis sensor formed on the flexible insulating substrate to be orthogonal to the X-axis sensor and responsible for sensing Y-axis strain; a metal electrode formed on a region of the flexible insulating substrate where the X-axis sensor and the Y-axis sensor are not formed; and an encapsulation layer formed on the X-axis sensor, the Y-axis sensor, and the metal electrode. In this case, the X-axis sensor and the Y-axis sensor have a metal-insulator heterostructure.

20 Claims, 17 Drawing Sheets

(56) References Cited

U.S. PATENT DOCUMENTS

| | | | | |
|---|---|---|---|---|
| 2012/0291549 A1* | 11/2012 | Seeger | ............... | G01C 19/5712 |
| | | | | 73/504.12 |
| 2013/0048950 A1* | 2/2013 | Levy | ............... | H01L 31/035227 |
| | | | | 257/29 |
| 2013/0335376 A1* | 12/2013 | Lee | ........................ | G06F 3/017 |
| | | | | 345/174 |
| 2018/0072569 A1* | 3/2018 | Berggren | ............ | B81C 1/00865 |

FOREIGN PATENT DOCUMENTS

| KR | 10-2018-0096913 A | 8/2018 |
|---|---|---|
| KR | 10-2018-0120992 A | 11/2018 |
| KR | 10-1931749 B1 | 12/2018 |

\* cited by examiner

[FIG. 1]
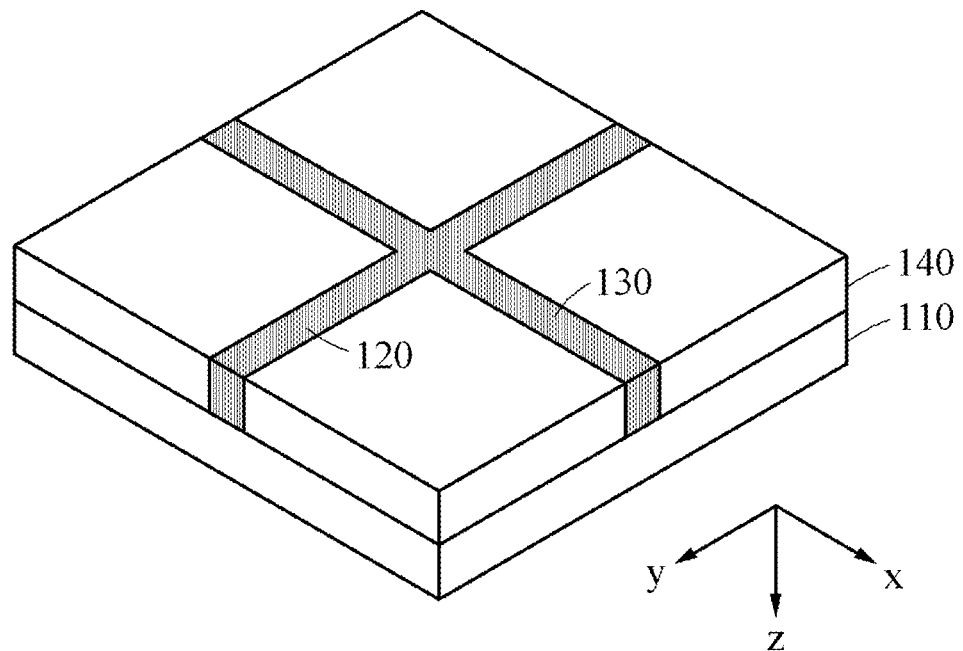
[FIG. 2]
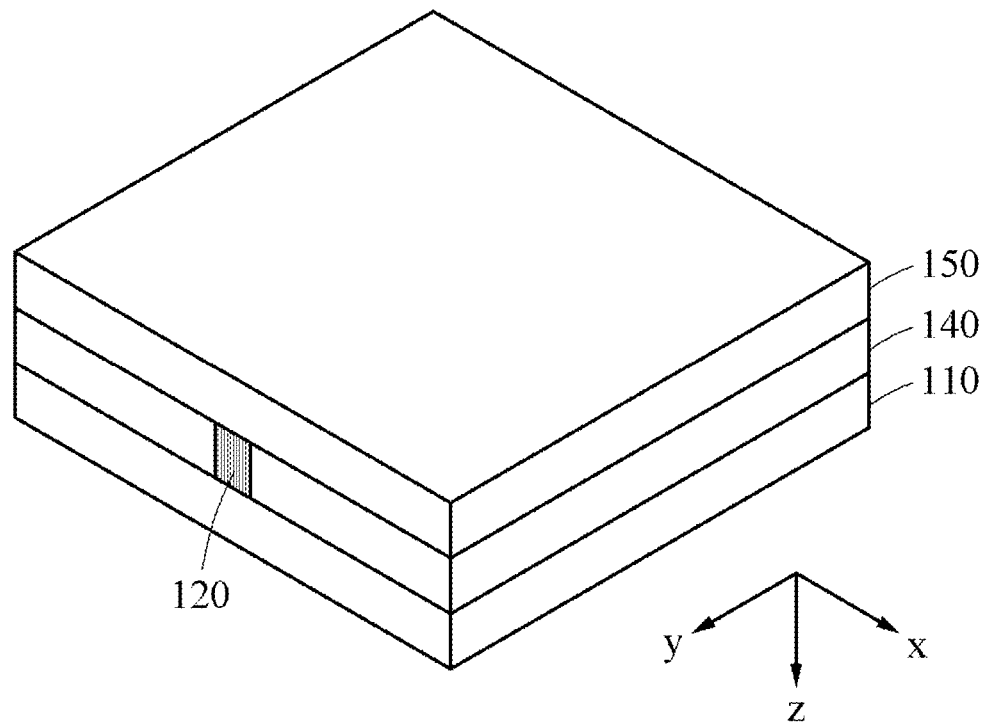

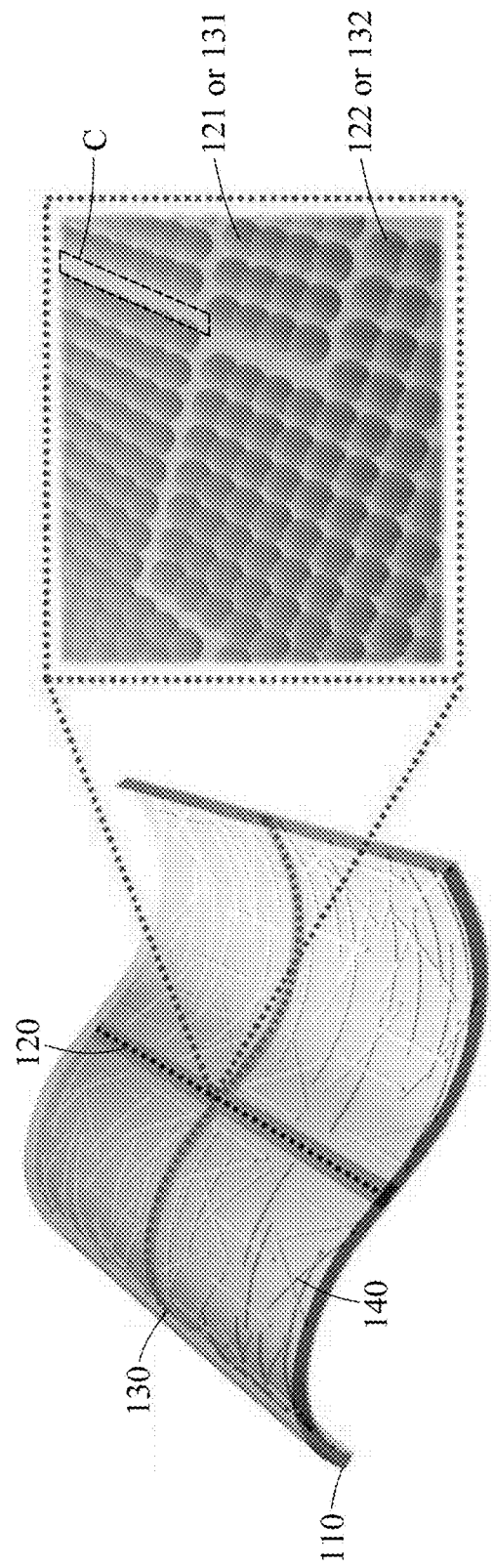
[FIG. 3]

[FIG. 4]
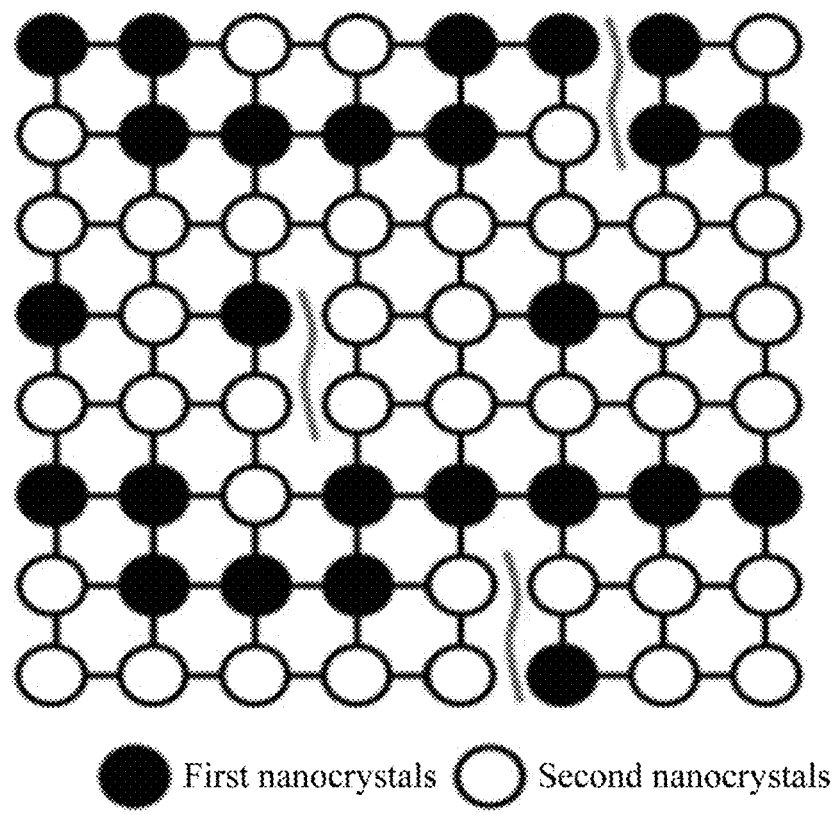

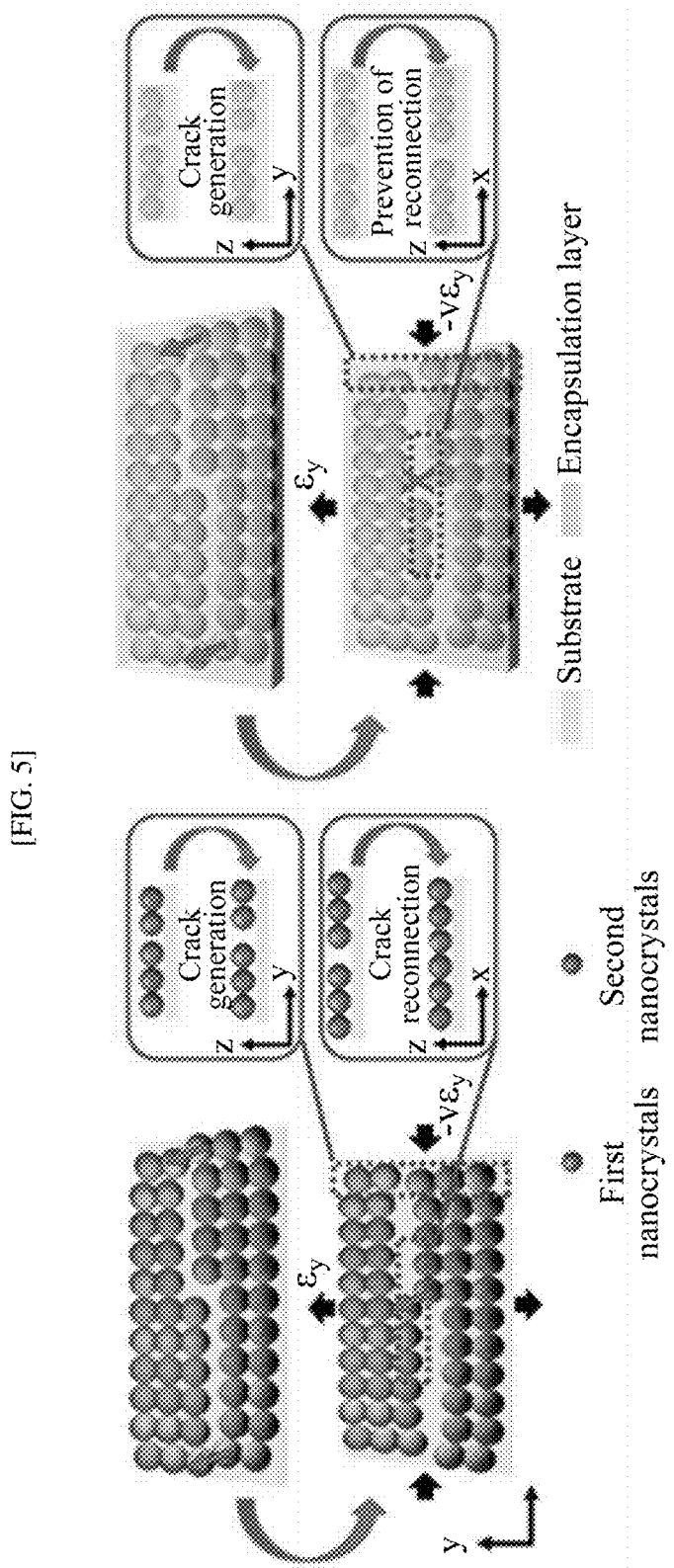
[FIG. 5]

[FIG. 6]
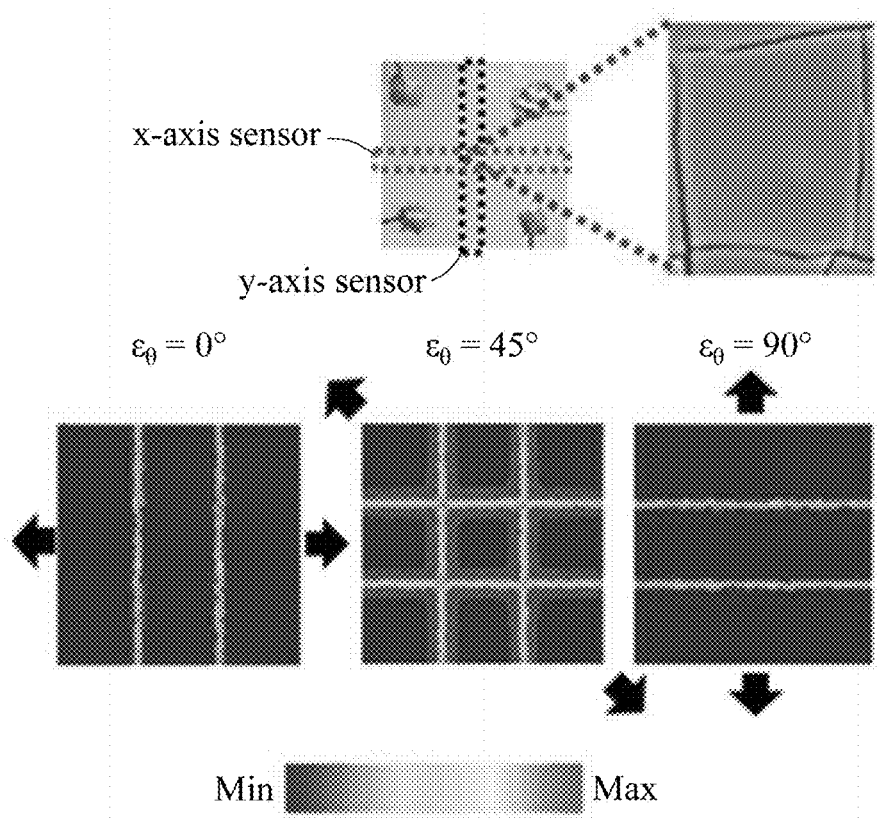

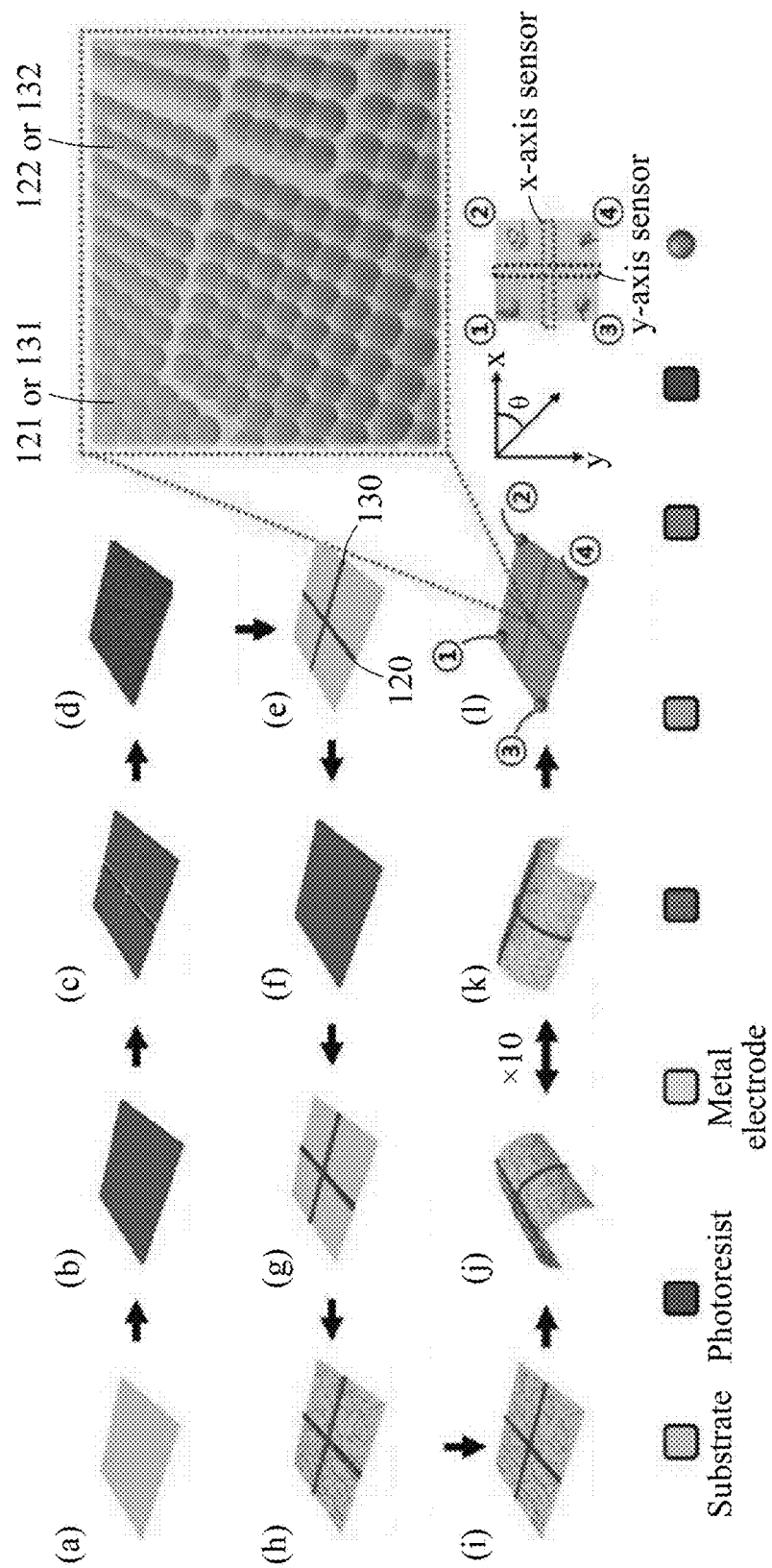
[FIG. 7]

[FIG. 8]
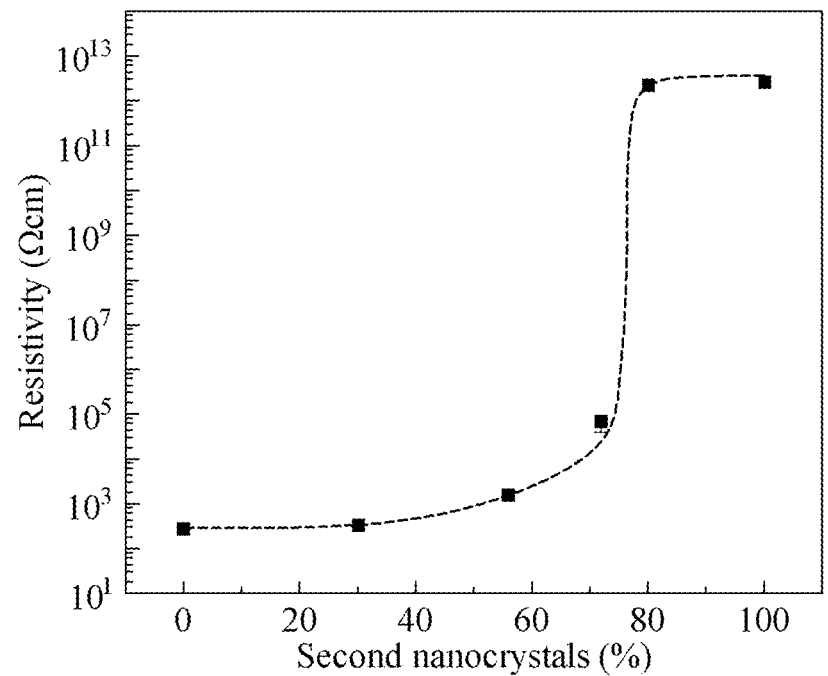
[FIG. 9]
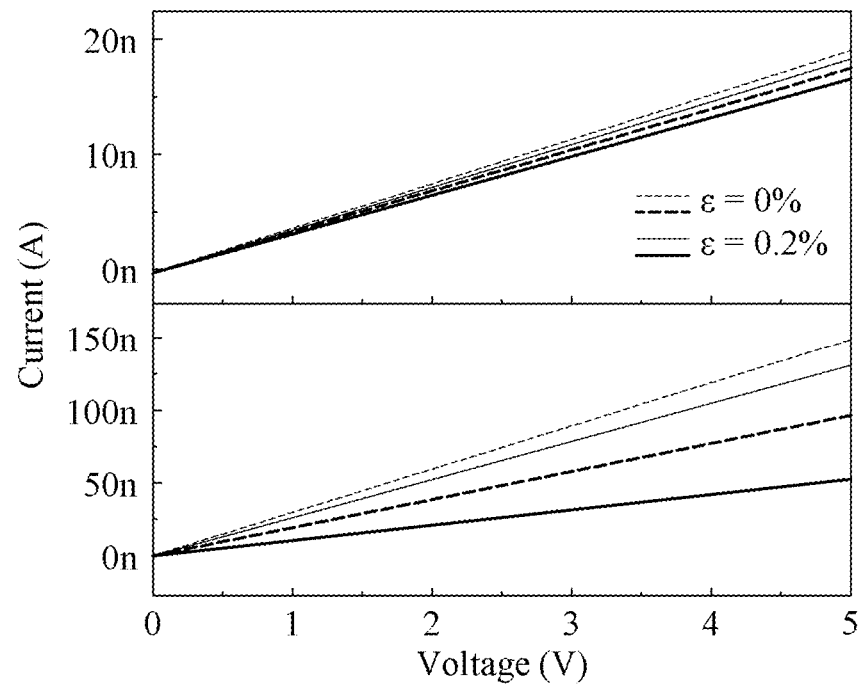

[FIG. 10]
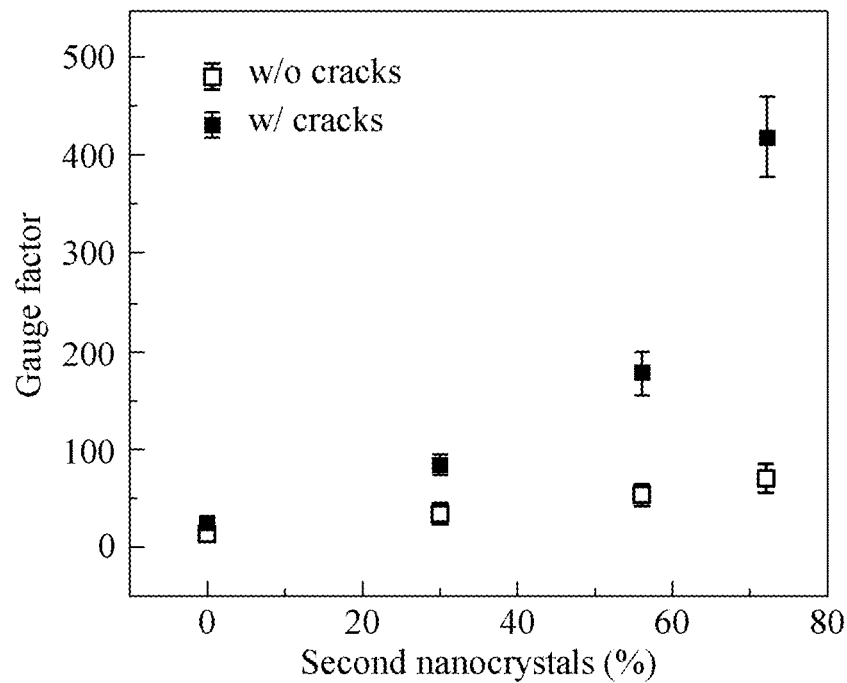
[FIG. 11]
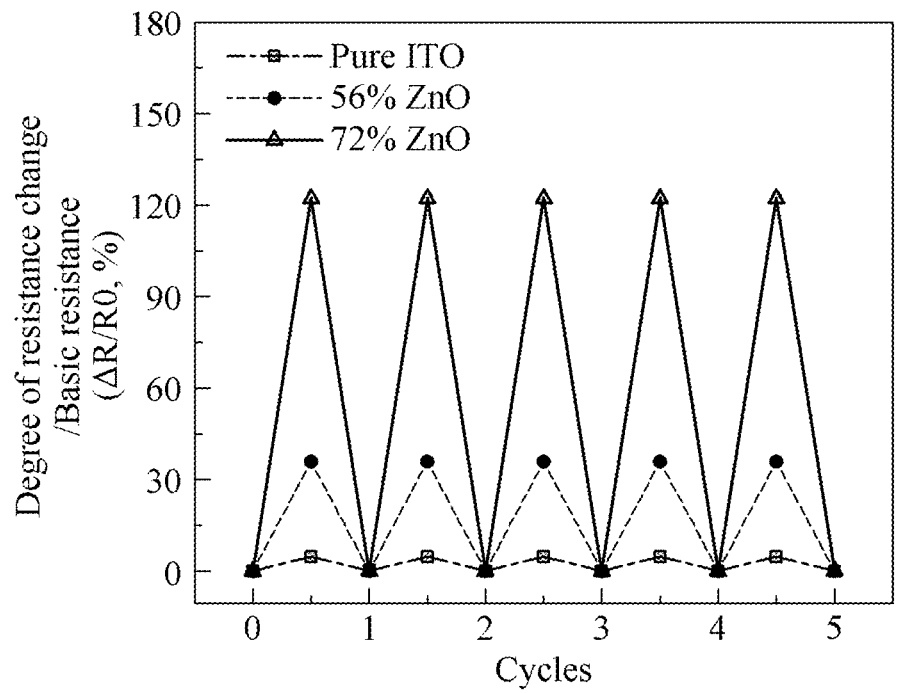

[FIG. 12]
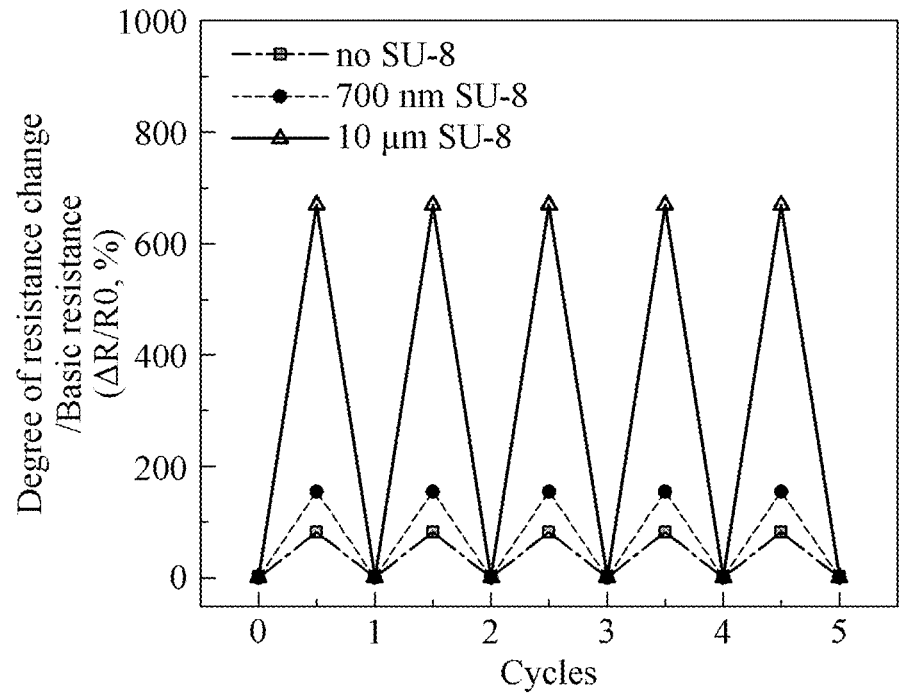
[FIG. 13]
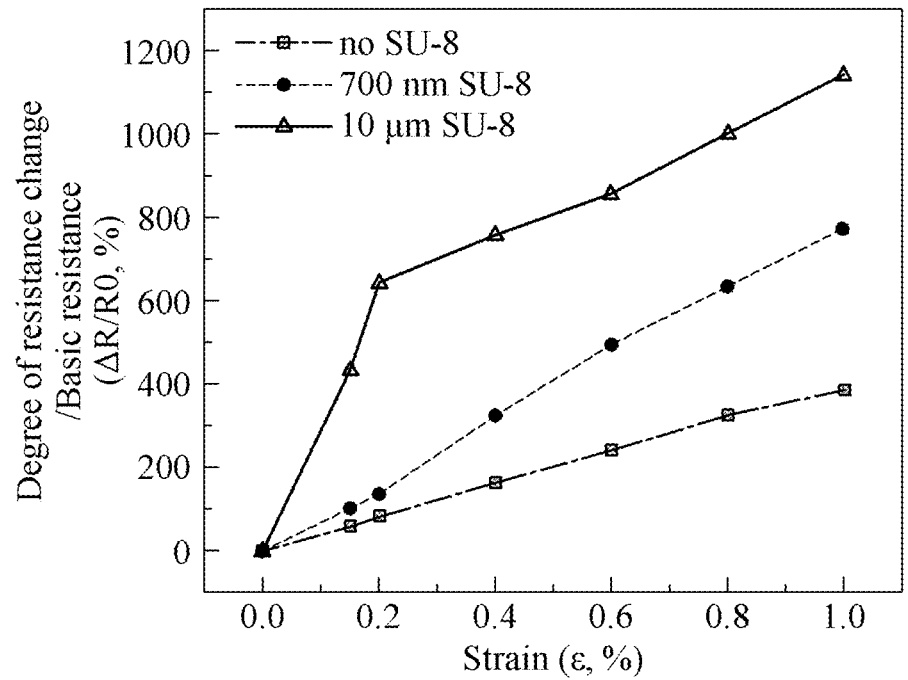

[FIG. 14]
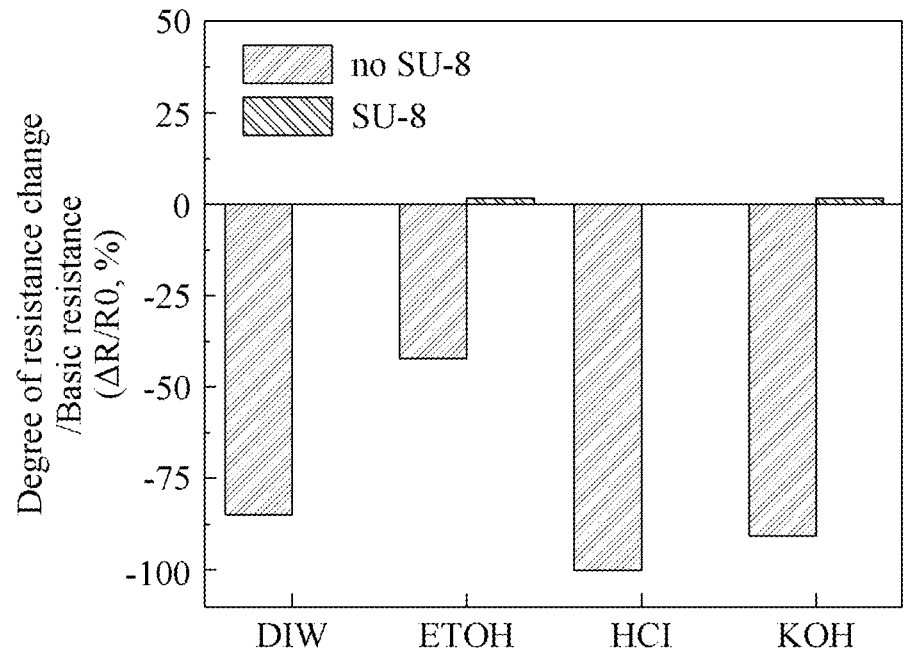
[FIG. 15]
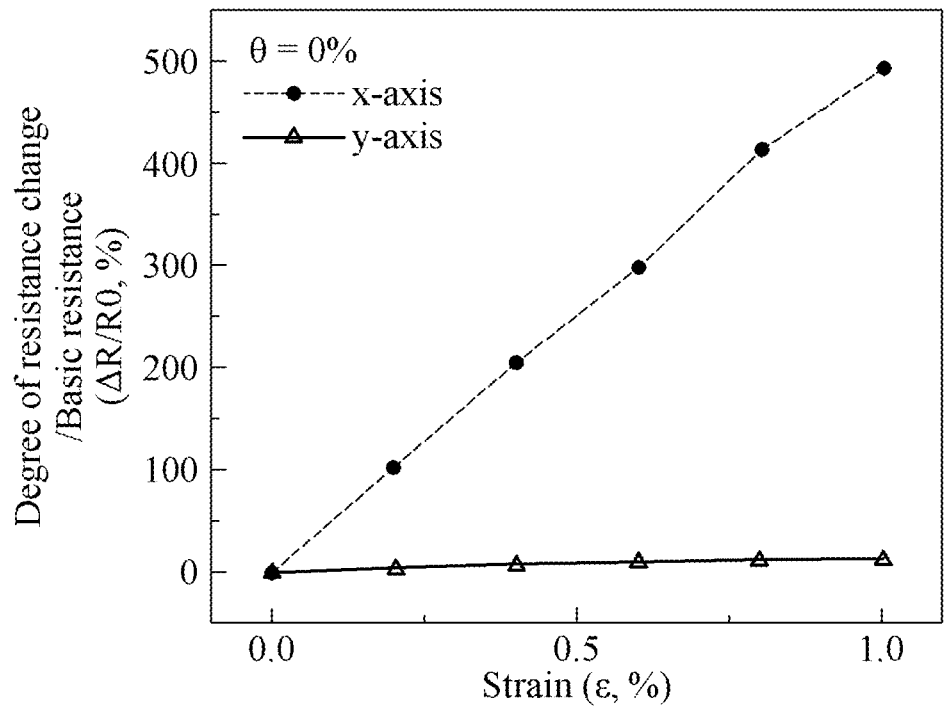

[FIG. 16]
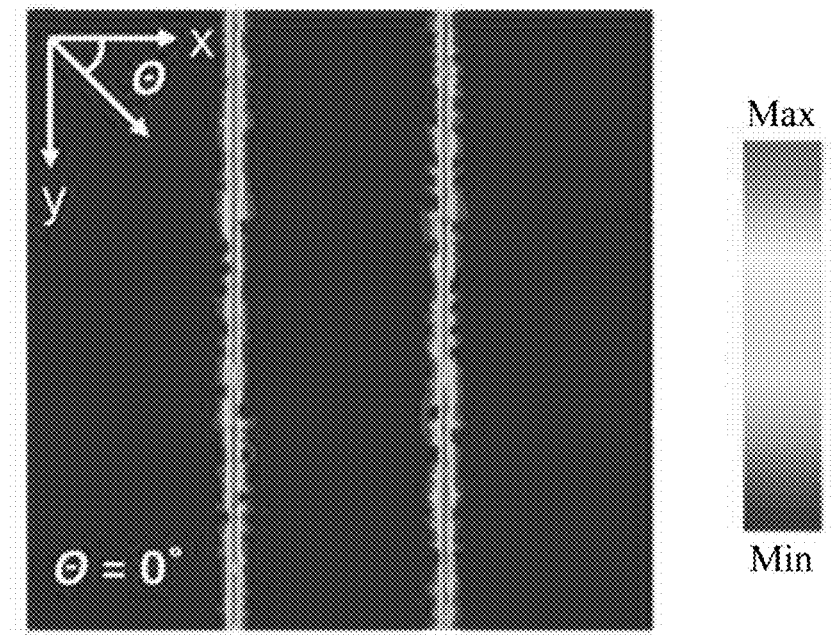
[FIG. 17]
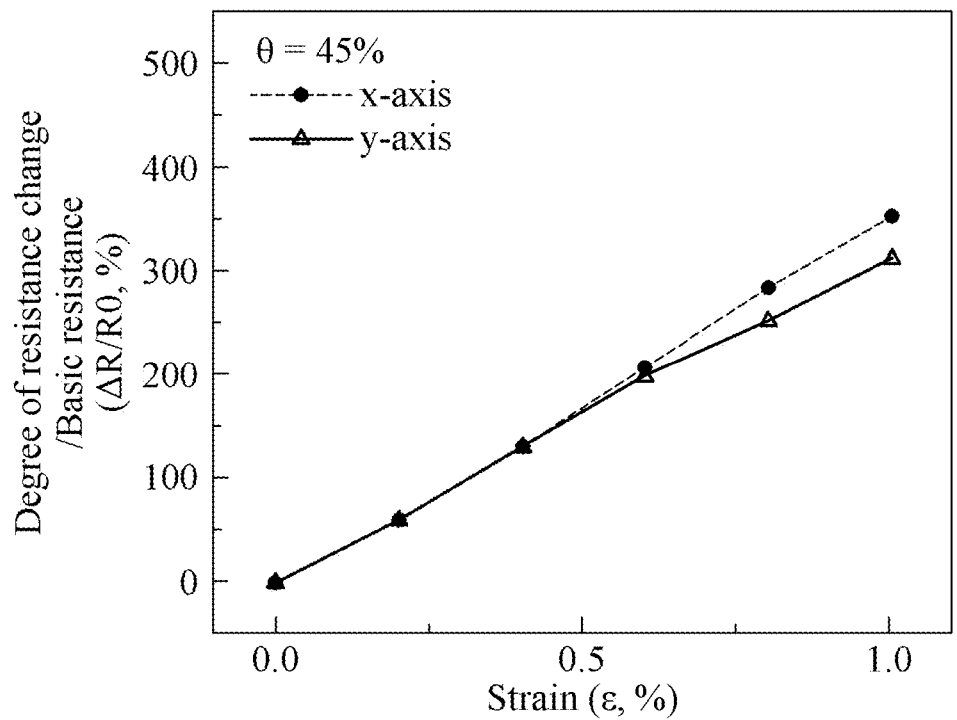

[FIG. 18]
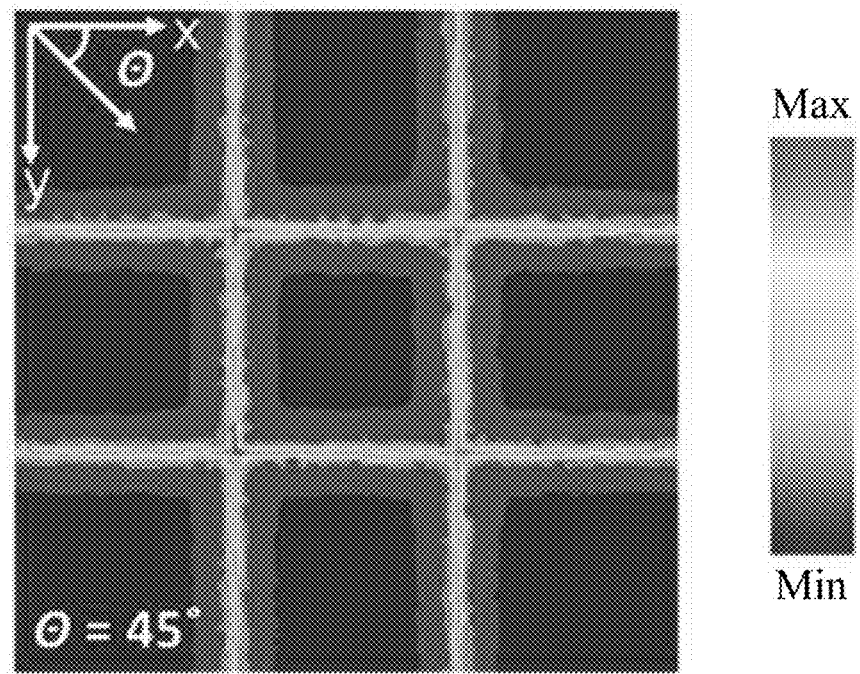
[FIG. 19]
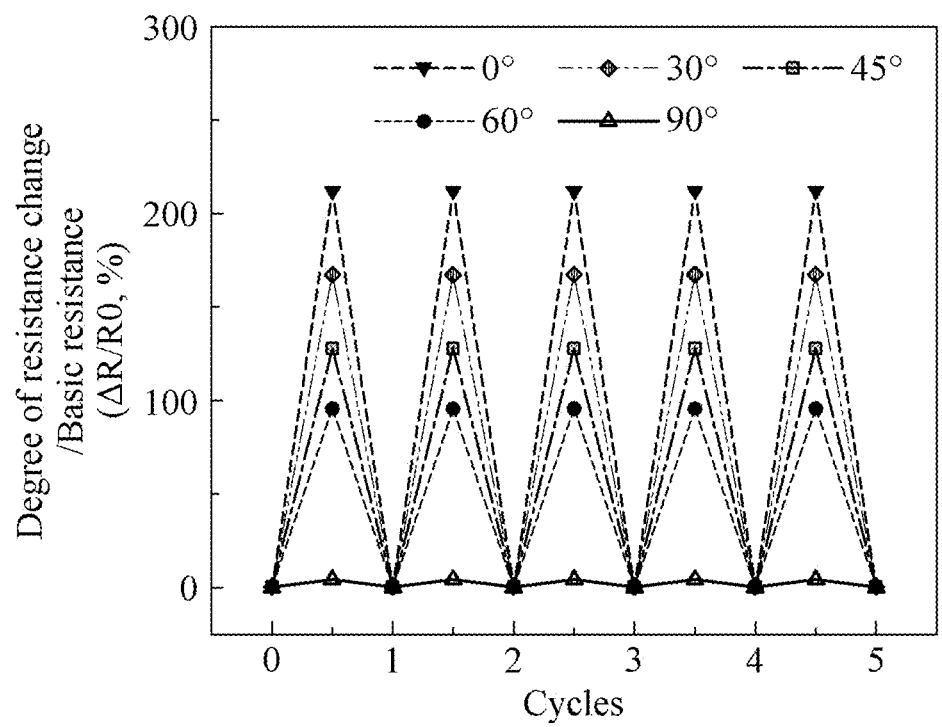

[FIG. 20]
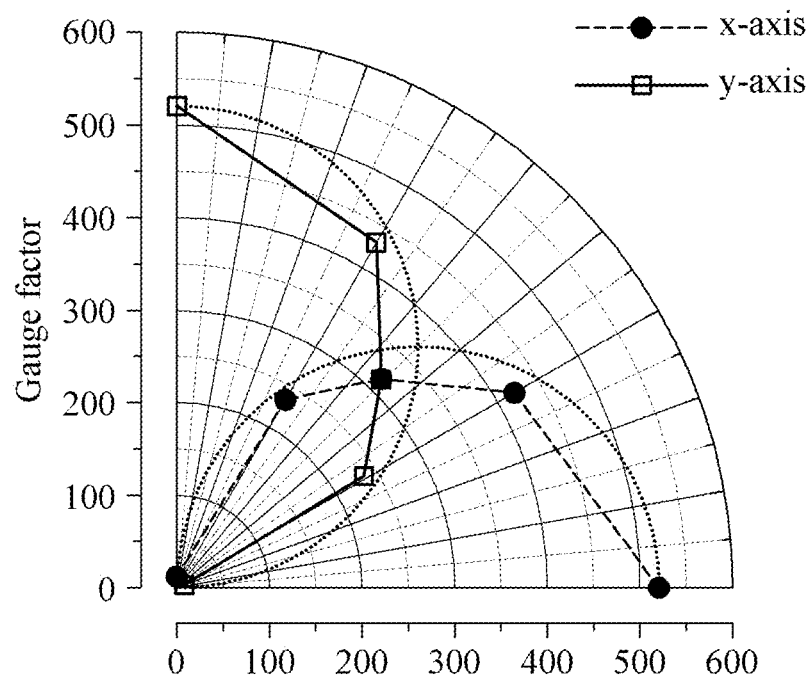
[FIG. 21]
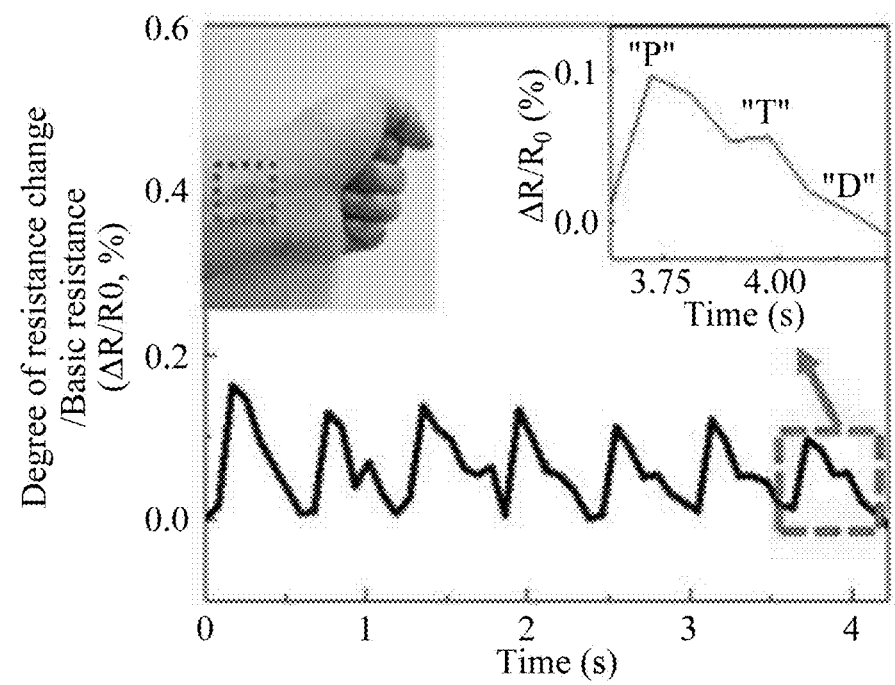

[FIG. 22]
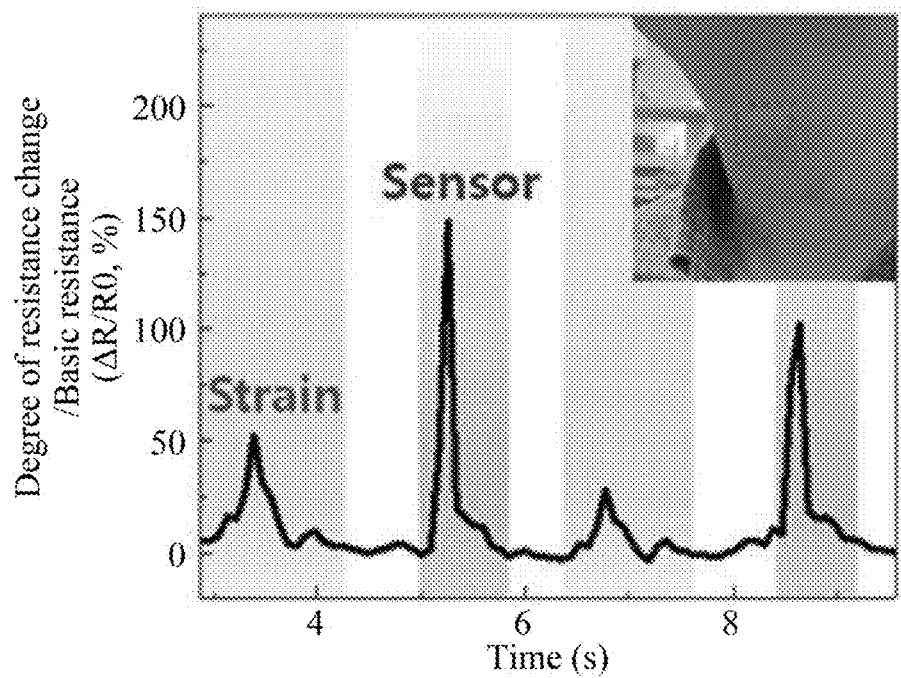
[FIG. 23]
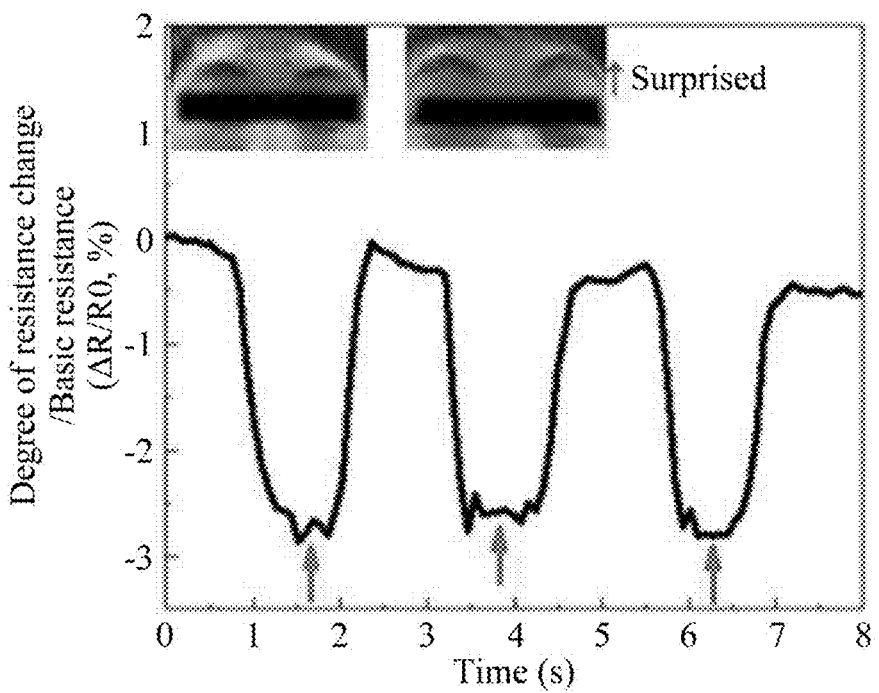

[FIG. 24]
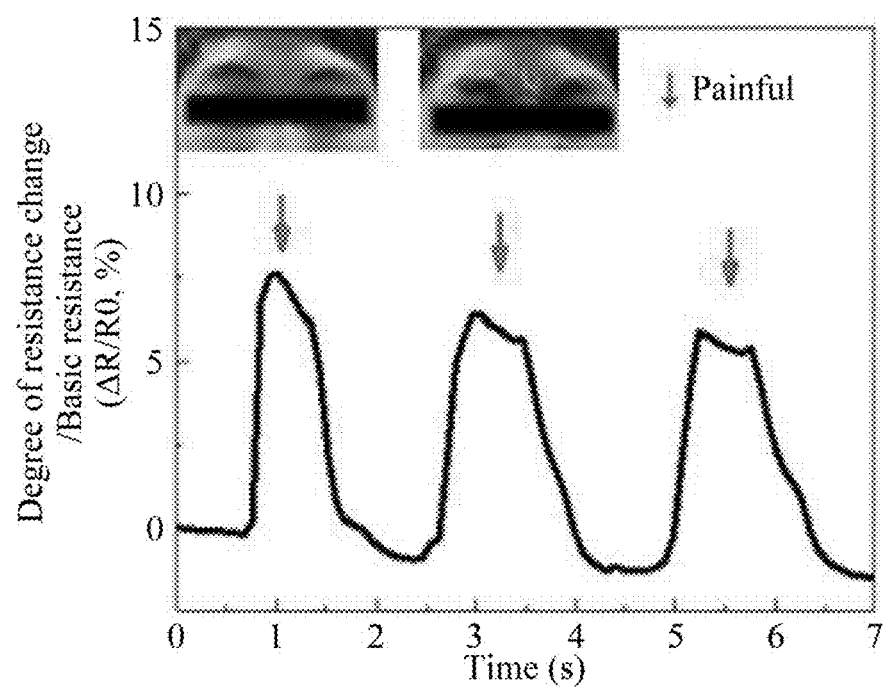
[FIG. 25]
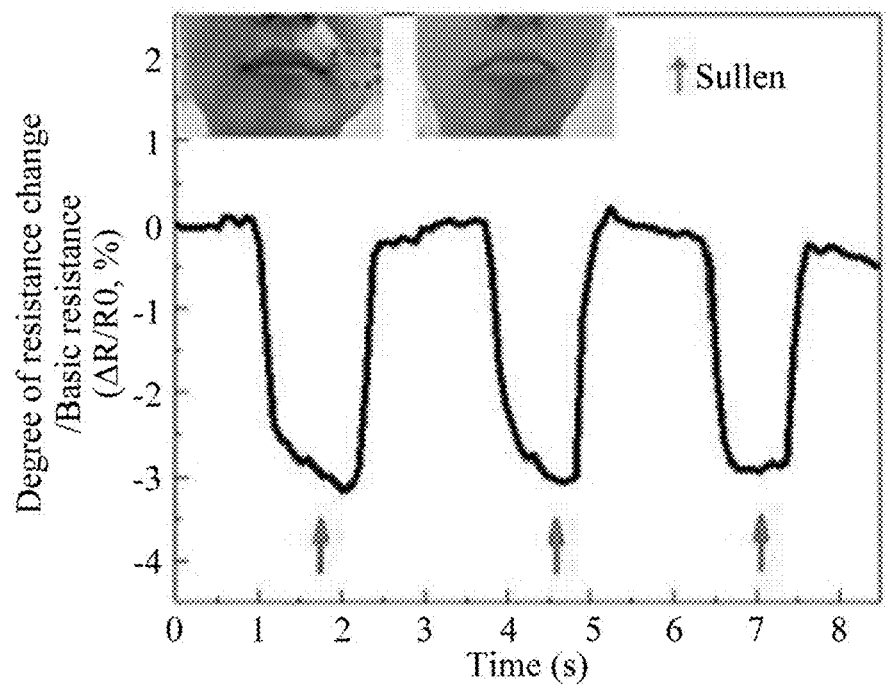

[FIG. 26]
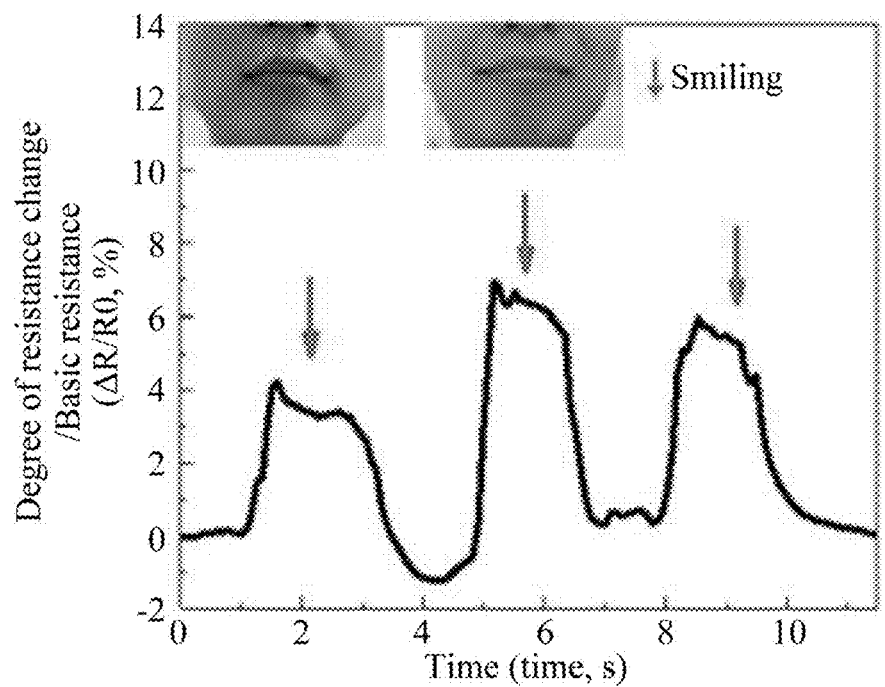
[FIG. 27]
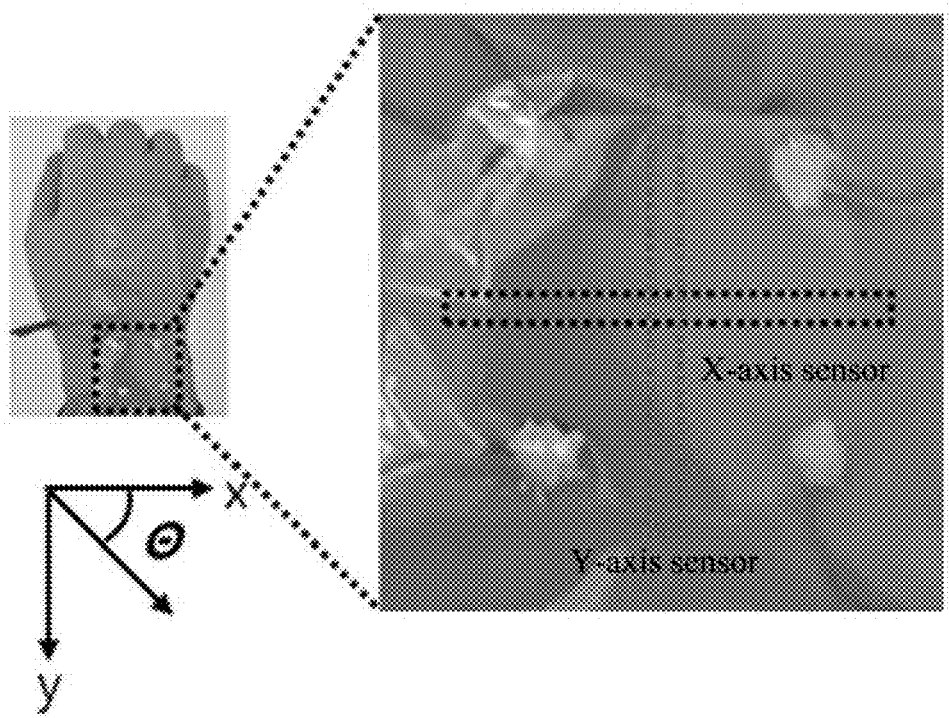

[FIG. 28]
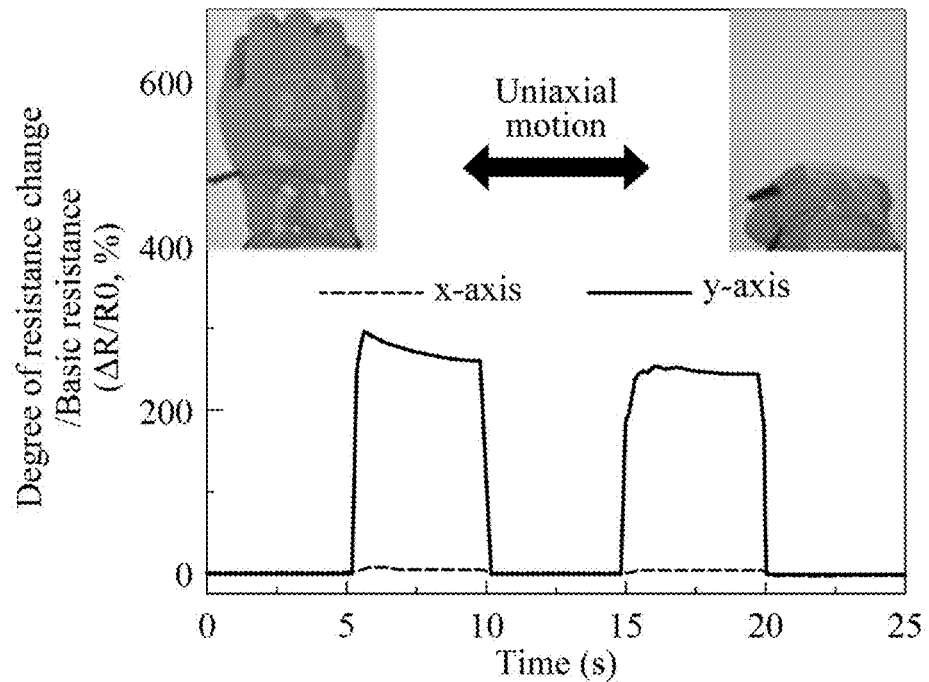
[FIG. 29]
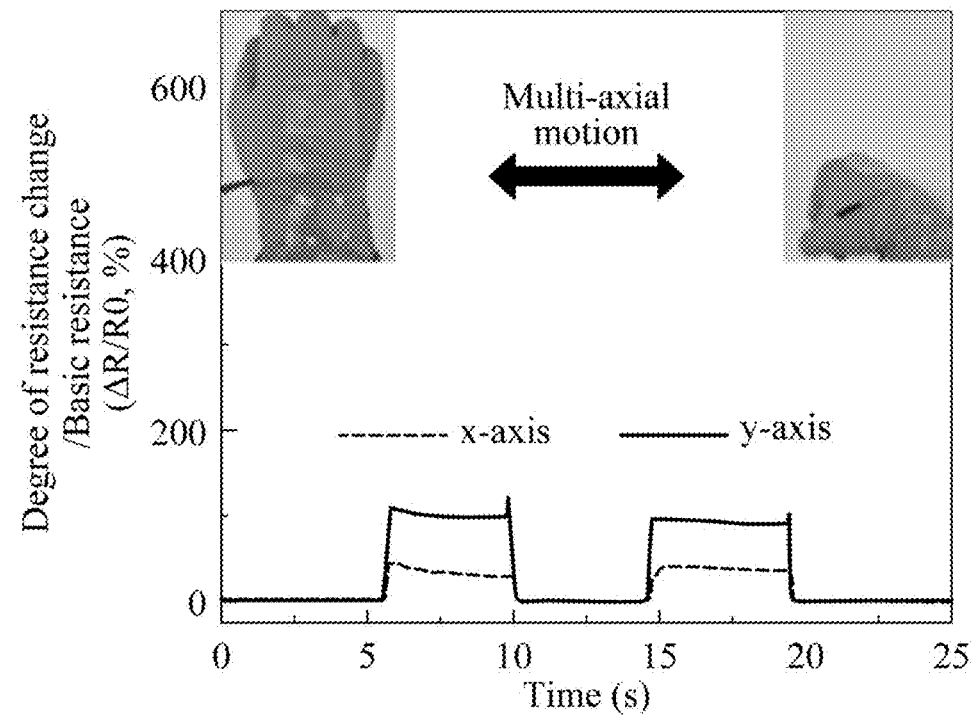

STRAIN SENSOR AND METHOD OF FABRICATING THE SAME

CROSS-REFERENCE TO RELATED APPLICATION

This application claims priority to Korean Patent Application No. 10-2019-0014455, filed on Feb. 7, 2019 in the Korean Intellectual Property Office, the disclosure of which is incorporated herein by reference.

BACKGROUND OF THE DISCLOSURE

Field of the Disclosure

The present disclosure relates to a strain sensor and a method of fabricating the same, and more particularly, to a metal-insulator heterostructure-based transparent multi-axis strain sensor and a method of fabricating the same.

Description of the Related Art

In general, a strain gauge or a strain sensor is used to convert a mechanical fine strain into an electrical signal and detect the electrical signal. More specifically, a strain sensor that measures strain such as tensile or compression of various structures including aircraft, automobiles, machine tools, bridges, ships, and the like enables effective performance of static and dynamic tests, structural stability tests, and the like. In general, a strain sensor is fabricated by attaching a strain gauge to a thin epoxy film and connecting wires thereto.

The basic operation principle of a strain sensor is as follows. When current is applied to a wire, resistance generated in the wire is inversely proportional to the cross-sectional area of the wire and proportional to the length of the wire. When a load is applied to a specimen to which a strain sensor is attached, the specimen is stretched or shrunk by the load, and the length and cross-sectional area of a wire included in the strain sensor are changed. At this time, strain can be measured by measuring changes in resistance depending on changes in the length and cross-sectional area of the wire.

Furthermore, flexible strain sensors can be used to detect strain in various fields such as motion detection devices, robotics, and biological or medical applications.

In particular, artificial skin should have excellent ability to detect deformation of skin due to various human motions and external stimuli and should be applicable to curved body parts. In addition to considerable flexibility and durability, artificial skin should be able to sense the directionality of human motions and external stimuli.

To meet these requirements, strain sensors are fabricated using carbon-based materials having excellent mechanical performance and inherent transparency. However, carbon-based materials have low gauge factors (GFs) and low electrical conductivity, which may cause problems. When a gauge factor is low, accurate detection of information about strain is difficult. In addition, sensors including an electrostatic capacity structure have excellent linearity and low hysteresis, but have a low gauge factor (maximum gauge factor of 1).

Recently, methods of using a low-cost solution process to apply nanoparticles to wearable strain sensors have been actively studied. However, conventional nanoparticle-based strain gauges are opaque, and the aesthetics thereof are poor. Accordingly, the conventional nanoparticle-based strain gauges are not suitable for use as a wearable device. In addition, since the sensitivity of the conventional nanoparticle-based strain gauges is very low, the strain gauges have difficulty in reading minute body signals such as blood pressure and breathing. In addition, the conventional strain gauges have a limitation in that the strain gauges can only detect strain in the uniaxial direction. Therefore, there is growing demand for a method for solving the problems of conventional strain gauges.

In particular, a technique for fabricating a strain sensor using a silver (Ag) nanowire having excellent electrical properties and mechanical properties has been proposed. However, the strain sensor including a nanowire has a limitation in that the strain sensor can only detect strain in one specific direction.

That is, a strain sensor capable of detecting multidimensional strain is required. However, conventional strain sensors are sensitive to strain occurring in one direction and, as such, the conventional strain sensors have difficulty in accurately detecting multidimensional and random strain.

RELATED DOCUMENTS

Patent Documents

Korean Patent No. 10-1813074, "METHOD OF FABRICATING STRAIN SENSOR, STRAIN SENSOR, AND WEARABLE DEVICE INCLUDING STRAIN SENSOR"
Korean Patent No. 10-1931749, "THREE-DIMENSIONAL STRAIN SENSOR AND METHOD OF FABRICATING THE SAME"

SUMMARY OF THE DISCLOSURE

Therefore, the present disclosure has been made in view of the above problems, and it is an object of the present disclosure to provide a strain sensor including an X-axis sensor and a Y-axis sensor including a metal-insulator heterostructure composed of first nanocrystals used as a metallic material and second nanocrystals used as an insulating material. With this configuration, the sensitivity of the strain sensor may be improved using percolation.

It is another object of the present disclosure to provide a strain sensor including an X-axis sensor and a Y-axis sensor including transparent first nanocrystals and transparent second nanocrystals. With this configuration, transparency of the strain sensor may be secured, and the strain sensor may perform multi-axis sensing.

It is yet another object of the present disclosure to provide a strain sensor and a method of fabricating the same. According to the present disclosure, by forming an encapsulation layer on an X-axis sensor and a Y-axis sensor each including cracks, the physical and chemical stability of the strain sensor may be improved. In addition, crack reconnection in the orthogonal direction due to the Poisson effect may be prevented, thereby significantly improving the sensitivity of the strain sensor.

It is yet another object of the present disclosure to provide a strain sensor applicable to various fields such as motion sensing, biosensors, next-generation mobile devices, wearable devices, automobiles, and ships and a method of fabricating the strain sensor.

It is yet another object of the present disclosure to provide a strain sensor capable of pulse measurement, speech recognition, or motion recognition and a method of fabricating the same.

In accordance with one aspect of the present disclosure, provided is a strain sensor including an X-axis sensor formed on a flexible insulating substrate and responsible for sensing X-axis strain; a Y-axis sensor formed on the flexible insulating substrate to be orthogonal to the X-axis sensor and responsible for sensing Y-axis strain; a metal electrode formed on a region of the flexible insulating substrate where the X-axis sensor and the Y-axis sensor are not formed; and an encapsulation layer formed on the X-axis sensor, the Y-axis sensor, and the metal electrode, wherein the X-axis sensor and the Y-axis sensor have a metal-insulator heterostructure.

The metal-insulator heterostructure may include first nanocrystals used as a metallic material and second nanocrystals used as an insulating material.

A volume ratio of the first nanocrystals to the second nanocrystals may be 38 to 18:62 to 82.

The first nanocrystals or the second nanocrystals may have a diameter of 5 nm to 15 nm.

The first nanocrystals or the second nanocrystals may include an organic ligand containing 1 to 3 carbon chains or an inorganic ligand.

The organic ligand containing 1 to 3 carbon chains may include at least one of 3-mercaptopropionic acid (MPA) and 1,2-ethanedithiol (EDT).

The inorganic ligand may include at least one of sulfide ion ($S^{2-}$), chloride ion ($Cl^-$), bromide ion ($Br^-$), thiocyanate ion ($SCN^-$), iodide ion ($I^-$), disulfide ion ($HS^-$), telluride ion ($Te^{2-}$), hydroxide ion ($OH^-$), tetrafluoroborate ion ($BF_4^-$), and hexafluorophosphate ion ($PF_6^-$).

The X-axis sensor and the Y-axis sensor may each include cracks therein.

The cracks may be formed in the X-axis sensor and the Y-axis sensor so that the cracks are orthogonal to each other.

The first nanocrystals may include at least one of indium tin oxide (ITO), fluorine-doped tin oxide (FTO), and aluminum-doped zinc oxide (AZO).

The second nanocrystals may include at least one of zinc oxide (ZnO), silicon oxide ($SiO_2$), and aluminum oxide ($Al_2O_3$).

The metal electrode may include at least one of a silver (Ag) nanowire, a copper (Cu) nanowire, an aluminum (Al) nanowire, a gold (Au) nanowire, a platinum (Pt) nanowire, a nickel (Ni) nanowire, a tungsten (W) nanowire, an iron (Fe) nanowire, a carbon nanotube (CNT), and graphene.

The encapsulation layer may include at least one of SU-8, polydimethylsiloxane (PDMS), Ecoflex, poly(methyl methacrylate) (PMMA), and polyimide.

In accordance with another aspect of the present disclosure, provided is a method of fabricating a strain sensor including a step of dispersing first nanocrystals and second nanocrystals in a solvent to prepare a sensing solution; a step of performing patterning using the sensing solution to form an X-axis sensor and a Y-axis sensor on a flexible insulating substrate so that the X-axis sensor and the Y-axis sensor are orthogonal to each other; a step of forming a metal electrode on a region of the flexible insulating substrate where the X-axis sensor and the Y-axis sensor are not formed; a step of forming cracks in the X-axis sensor and the Y-axis sensor; and a step of forming an encapsulation layer on the X-axis sensor in which cracks are formed, the Y-axis sensor in which cracks are formed, and the metal electrode.

The X-axis sensor and the Y-axis sensor may have a metal-insulator heterostructure.

A volume ratio of the first nanocrystals to the second nanocrystals may be 38 to 18:62 to 82.

The step of performing may further include a step of replacing a first organic ligand formed on the surfaces of the first nanocrystals and the second nanocrystals with a second organic ligand or an inorganic ligand.

The first organic ligand may contain 8 to 18 carbon chains.

The second organic ligand may contain 1 to 3 carbon chains.

The inorganic ligand may include at least one of sulfide ion ($S^{2-}$), chloride ion ($Cl^-$), bromide ion ($Br^-$), thiocyanate ion ($SCN^-$), iodide ion ($I^-$), disulfide ion ($HS^-$), telluride ion ($Te^{2-}$), hydroxide ion ($OH^-$), tetrafluoroborate ion ($BF_4^-$), and hexafluorophosphate ion ($PF_6^-$).

BRIEF DESCRIPTION OF THE DRAWINGS

FIGS. 1 and 2 each show a three-dimensional shape of a strain sensor according to an embodiment of the present disclosure.

FIG. 3 is a schematic view showing a strain sensor according to an embodiment of the present disclosure.

FIG. 4 is a schematic view showing cracks in an X-axis sensor and a Y-axis sensor of a strain sensor according to an embodiment of the present disclosure.

FIG. 5 includes drawings for explaining changes of cracks in an X-axis sensor and a Y-axis sensor depending on the encapsulation layer of a strain sensor according to an embodiment of the present disclosure.

FIG. 6 includes images showing the orthogonal cracks of the strain sensor according to an embodiment of the present disclosure, and images showing analysis results using a finite element method (FEM).

FIG. 7 is a schematic view for explaining a method of fabricating a strain sensor according to an embodiment of the present disclosure.

FIG. 8 is a graph showing the resistivity of the X-axis sensor or the Y-axis sensor of the strain sensor according to an embodiment of the present disclosure depending on the ratio of the second nanocrystals.

FIG. 9 is a graph showing current-voltage properties according to bending states before crack formation (black line) and after crack formation (red line) in an X-axis sensor or a Y-axis sensor (pure ITO NC) including only first nanocrystals under a strain of 0% (dotted line) or a strain of 0.2% (solid line) and showing current-voltage properties according to bending states before crack formation (black line) and after crack formation (red line) in the X-axis sensor or the Y-axis sensor (72% ZnO NC hybrid) of the strain sensor according to an embodiment of the present disclosure, and FIG. 10 is a graph showing gauge factors depending on the ratios of the second nanocrystals before crack formation (w/o cracks) and after crack formation (w/cracks) in the X-axis sensor or the Y-axis sensor of the strain sensor according to an embodiment of the present disclosure.

FIG. 11 is a graph showing the resistance change cycles, under a strain of 0.2%, of an X-axis sensor or a Y-axis sensor (pure ITO NC) including only first nanocrystals, the X-axis sensor or the Y-axis sensor (56% ZnO NC hybrid) including 56% second nanocrystals of the strain sensor according to an embodiment of the present disclosure, and the X-axis sensor or the Y-axis sensor (72% ZnO NC hybrid) including 72% second nanocrystals of the strain sensor according to an embodiment of the present disclosure.

FIG. 12 is a graph showing resistance change depending on the strain cycles, under a strain of 0.2%, of a strain sensor (no SU-8) not including an encapsulation layer and a strain sensor according to an embodiment of the present disclosure including an encapsulation layer (700 nm SU-8) having a thickness of 700 nm or an encapsulation layer (10 μm SU-8) having a thickness of 10 μm, and FIG. 13 is a graph showing resistance change depending on the applied strain of a strain sensor (no SU-8) not including an encapsulation layer and a strain sensor according to an embodiment of the present disclosure including an encapsulation layer (700 nm SU-8) having a thickness of 700 nm or an encapsulation layer (10 μm SU-8) having a thickness of 10 μm.

FIG. 14 is a graph showing resistance change according to deionized water (DIW), ethanol (ETON), hydrochloric acid (HCl), or potassium hydroxide (KOH) treatment in a strain sensor (no SU-8) not including an encapsulation layer and a strain sensor (SU-8) according to an embodiment of the present disclosure including an encapsulation layer having a thickness of 10 μm.

FIG. 15 is a graph showing resistance change according to increase in strain, when the angle (θ) between an X-axis and the direction of an applied strain is 0°, in the strain sensor according to an embodiment of the present disclosure, and FIG. 16 is an image showing analysis results using a finite element method (FEM) that show the strain distribution of the strain sensor according to an embodiment of the present disclosure including orthogonal cracks.

FIG. 17 is a graph showing resistance change according to increase in strain, when the angle (θ) between an X-axis and the direction of an applied strain is 45°, in the strain sensor according to an embodiment of the present disclosure, and FIG. 18 is an image showing analysis results using a finite element method (FEM) that show the strain distribution of the strain sensor according to an embodiment of the present disclosure including orthogonal cracks.

FIG. 19 is a graph showing the resistance change cycles of the X-axis sensor of the strain sensor according to an embodiment of the present disclosure when the angle (θ) between an X-axis and the direction of an applied strain is 0°, 30°, 45°, 60°, or 90°, and FIG. 20 is a graph showing gauge factors according to angular functions of the X-axis in the X-axis sensor and the Y-axis sensor having a cross-shaped pattern of the strain sensor according to an embodiment of the present disclosure.

FIG. 21 is a graph showing real-time human pulse monitoring of the strain sensor according to an embodiment of the present disclosure applied to the wrist.

FIG. 22 is a graph showing change in the sound signal of the strain sensor according to an embodiment of the present disclosure attached to a user's neck when the user pronounces "strain" and "sensor" twice.

FIGS. 23 and 24 are graphs showing the resistance change of the strain sensor according to an embodiment of the present disclosure attached to a user's forehead when the user is surprised or in pain.

FIGS. 25 and 26 are graphs showing the resistance change of the strain sensor according to an embodiment of the present disclosure attached near the mouth of a user when the user is sullen or smiling.

FIG. 27 includes images showing the strain sensor according to an embodiment of the present disclosure attached to a user's wrist, FIG. 28 is a graph showing resistance change according to uniaxial motion in the strain sensor according to an embodiment of the present disclosure, and FIG. 29 is a graph showing resistance change according to multi-axis motion in the strain sensor according to an embodiment of the present disclosure.

DETAILED DESCRIPTION OF THE DISCLOSURE

In the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

FIGS. 1 and 2 each show a three-dimensional shape of a strain sensor according to an embodiment of the present disclosure.

The strain sensor according to an embodiment of the present disclosure includes an X-axis sensor 120 formed on a flexible insulating substrate 110 and responsible for sensing X-axis strain, a Y-axis sensor 130 formed on the flexible insulating substrate 110 to be orthogonal to the X-axis sensor 120 and responsible for sensing Y-axis strain, a metal electrode 140 formed on a region of the flexible insulating substrate 110 where the X-axis sensor 120 and the Y-axis sensor 130 are not formed, and an encapsulation layer 150 formed on the X-axis sensor 120, the Y-axis sensor 130, and the metal electrode 140.

In addition, in the strain sensor according to an embodiment of the present disclosure, the X-axis sensor 120 and the Y-axis sensor 130 include a metal-insulator heterostructure composed of first nanocrystals used as a metallic material and second nanocrystals used as an insulating material. With this configuration, the sensitivity of the strain sensor may be improved using percolation.

In addition, in the strain sensor according to an embodiment of the present disclosure, the X-axis sensor 120 and the Y-axis sensor 130 include transparent first nanocrystals and transparent second nanocrystals. With this configuration, transparency of the strain sensor may be secured, and the strain sensor may sense strain in multiple axes. In addition, by forming an encapsulation layer on the X-axis sensor 120 and the Y-axis sensor 130, the physical and chemical stability of the strain sensor may be improved, and crack reconnection in the orthogonal direction due to the Poisson effect may be prevented, thereby significantly improving the sensitivity of the strain sensor.

The strain sensor according to an embodiment of the present disclosure will be described in detail with reference to FIG. 3.

FIG. 3 is a schematic view showing a strain sensor according to an embodiment of the present disclosure.

The strain sensor according to an embodiment of the present disclosure includes the flexible insulating substrate 110.

Since the flexible insulating substrate 110 is attached to an object to be deformed by external force, the flexible insulating substrate 110 should be deformed together with the object when external force is applied. Accordingly, the flexible insulating substrate 110 should have flexibility. In addition, since the X-axis sensor 120, the Y-axis sensor 130, and the metal electrode 140 through which current flows are arranged on one side of the flexible insulating substrate 110, the flexible insulating substrate 110 should have insulating properties so that current does not flow to the object.

Therefore, the flexible insulating substrate 110 may include at least one of polyester, polyvinyl, polycarbonate, polyethylene, polyacetate, polyimide (PI), polyethersulphone (PES), polyacrylate (PAR), polyethylene naphthalate (PEN), and polyethylene terephthalate (PET), but the material of the flexible insulating substrate 110 is not limited thereto, and any material having flexibility and insulating properties may be used as the material of the flexible insulating substrate 110.

The strain sensor according to an embodiment of the present disclosure includes the X-axis sensor 120 for sensing X-axis strain and the Y-axis sensor 130 formed on the flexible insulating substrate 110 to be orthogonal to the X-axis sensor 120 and responsible for sensing Y-axis strain.

In the strain sensor according to an embodiment of the present disclosure, since the X-axis sensor 120 and the Y-axis sensor 130 are orthogonal to each other, a cross-shaped pattern may be formed, so that the strength and direction of strain may be detected at the same time.

The X-axis sensor 120 is formed on the Y-axis to sense strain in the X-axis direction, and the Y-axis sensor 130 is formed on the X-axis to sense strain in the Y-axis direction.

The strain sensor according to an embodiment of the present disclosure includes the X-axis sensor 120 and the Y-axis sensor 130 having a metal-insulator heterostructure. With this configuration, the sensitivity and stability of the strain sensor may be improved using percolation.

More specifically, in the strain sensor according to an embodiment of the present disclosure, the X-axis sensor 120 and the Y-axis sensor 130 include a metal-insulator heterostructure including first nanocrystals 121 and 131 used as a metallic material and second nanocrystals 122 and 132 used as an insulating material. With this configuration, the sensitivity of the strain sensor may be improved using percolation.

Percolation is the most basic concept among theories describing a random state, and is expressed as a probability value for materials that are disorderly present in a certain space.

Generally, percolation theory is used to study charge transport in a structure obtained by mixing a conductive or metallic component and an insulating component. According to percolation theory, when the ratio of the metallic component is lower than a percolation threshold or when the ratio of the insulating component is higher than a percolation threshold, the electrical resistance of the structure approaches zero. As the ratio of the metallic component increases, the size of a cluster of the conductive components increases. Accordingly, at a percolation threshold or more, an infinite cluster connecting two external electrodes appears and grows to generate a conduction path. Conduction begins to occur in disordered metallic materials above a certain condition. In this case, the condition is called percolation threshold.

Therefore, in the metal-insulator heterostructure, as the ratio of the first nanocrystals 121 and 131 increases, conductivity increases. In particular, when the ratio of the first nanocrystals 121 and 131 exceeds a percolation threshold, resistance is dramatically reduced, so that the electrical properties of the heterostructure are converted from an insulator to a metal.

In this case, near the percolation threshold, such a system exhibits a sudden change in resistance to external stimuli such as strain. According to the present disclosure, a metal-insulator strain gauge is fabricated using this principle, and the sensitivity of the strain sensor may be improved.

That is, in the strain sensor according to an embodiment of the present disclosure, when the volume ratio of the second nanocrystals 122 and 132 is used as a criterion, when the volume ratio exceeds a percolation threshold, resistance increases significantly, and the strain sensor may be fabricated with respect to the critical point. Accordingly, when the volume ratio of the first nanocrystals 121 and 131 is slightly higher than the critical point at which resistance increases significantly, a measurable level of resistance may be generated, and when strain is applied, the resistance increases significantly and the strain may be measured.

In addition, when strain is applied at the same point on the flexible insulating substrate 110, the electrical resistance values of the X-axis sensor 120 and the Y-axis sensor 130 may metal characteristics or insulation characteristics by a percolation mechanism.

Any transparent metal oxide having conductivity at room temperature (273 K) may be used as the first nanocrystals 121 and 131 included in the X-axis sensor 120 and the Y-axis sensor 130 of the strain sensor according to an embodiment of the present disclosure without limitation, and any transparent non-conductive material having low electrical conductivity at room temperature (273 K) may be used as the second nanocrystals 122 and 132 without limitation.

For example, the first nanocrystals 121 and 131 may include at least one of indium tin oxide (ITO), fluorine-doped tin oxide (FTO), and aluminum-doped zinc oxide (AZO), and the second nanocrystals 122 and 132 may include at least one of zinc oxide (ZnO), silicon oxide ($SiO_2$), and aluminum oxide ($Al_2O_3$).

Preferably, metal oxides having transparent properties may be used as the first nanocrystals 121 and 131 and the second nanocrystals 122 and 132 included in the X-axis sensor 120 and the Y-axis sensor 130 of the strain sensor according to an embodiment of the present disclosure, indium tin oxide (ITO) may be used as the first nanocrystals 121 and 131, and zinc oxide (ZnO) may be used as the second nanocrystals 122 and 132.

Specifically, a semiconductor has a band gap between a valence band and a conduction band. Since energy greater than the band gap must be applied to move electrons in the valence band, an intrinsic semiconductor may have low electrical conductivity, like a nonconductor.

However, when a semiconductor is doped, the doped semiconductor may have electrons in the conduction band thereof by only thermal energy at room temperature (273 K) depending on doping concentrations, so that the doped semiconductor may have electrical conductivity.

Since indium tin oxide (ITO) is prepared by doping indium oxide (InO) with tin (Sn), indium tin oxide (ITO) has electrical conductivity at room temperature (273 K). Accordingly, indium tin oxide (ITO) may be used as a transparent electrode. Since zinc oxide (ZnO) is naturally n-type due to oxygen vacancy but has a relatively low concentration of electron carriers, zinc oxide (ZnO) has low electrical conductivity.

In this case, since oxygen vacancy included in zinc oxide (ZnO) is one of defects, there is a limitation in increasing carrier concentration only by oxygen vacancy. However, since indium tin oxide (ITO) is doped with tin (Sn), indium tin oxide (ITO) has a larger number of carriers than zinc oxide (ZnO).

Therefore, although indium tin oxide (ITO) and zinc oxide (ZnO) are both metal oxides having semiconductor properties, in the X-axis sensor 120 and the Y-axis sensor 130 of the strain sensor according to an embodiment of the present disclosure, indium tin oxide (ITO) may be used as a metallic material and zinc oxide (ZnO) may be used as an insulating material.

For example, when indium tin oxide is used as the first nanocrystals 121 and 131 and zinc oxide is used as the second nanocrystals 122 and 132, indium tin oxide forms a charge transfer path, zinc oxide acts as an impurity serving as an insulator, and the metal-insulator ratio in the X-axis sensor 120 and the Y-axis sensor 130 may be controlled.

In addition, since the strain sensor according to an embodiment of the present disclosure includes the transparent first nanocrystals 121 and 131 and the transparent second nanocrystals 122 and 132 as the X-axis sensor 120 and the Y-axis sensor 130, transparency of the strain sensor may be secured, and the strain sensor may perform multi-axis sensing.

In addition, since the first nanocrystals 121 and 131 and the second nanocrystals 122 and 132 included in the X-axis sensor 120 and the Y-axis sensor 130 according to an embodiment of the present disclosure do not contain cadmium (Cd) and lead (Pb), environmental pollution and manufacturing costs may be reduced.

The volume ratio of the first nanocrystals 121 and 131 to the second nanocrystals 122 and 132 included in the X-axis sensor 120 and the Y-axis sensor 130 of the strain sensor according to an embodiment of the present disclosure may be 38 to 18:62 to 82. When the volume ratio of the first nanocrystals 121 and 131 to the second nanocrystals 122 and 132 exceeds 38:62, due to increase in the volume ratio of the first nanocrystals 121 and 131, electrical conductivity may be improved, but sensitivity may be reduced. When the volume ratio of the second nanocrystals 122 and 132 to the first nanocrystals 121 and 131 exceeds 18:82, due to increase in the volume ratio of the second nanocrystals 122 and 132, electrical conductivity may be dramatically reduced. As a result, measurement of strain may be difficult, and sensitivity may be excessively increased.

Therefore, in the X-axis sensor 120 and the Y-axis sensor 130 of the strain sensor according to an embodiment of the present disclosure, depending on the volume ratio of the first nanocrystals 121 and 131 to the second nanocrystals 122 and 132, the electrical conductivity and sensitivity of the strain sensor may be controlled. For example, when the volume ratio of the first nanocrystals 121 and 131 increases, electrical conductivity may be increased, but sensitivity may be decreased. In contrast, when the volume ratio of the second nanocrystals 122 and 132 increases, electrical conductivity may be decreased, but sensitivity may be increased. Therefore, according to an embodiment of the present disclosure, the volume ratio of the first nanocrystals 121 and 131 to the second nanocrystals 122 and 132 may be controlled to fabricate a strain sensor having desired electrical conductivity and sensitivity.

In the X-axis sensor 120 and the Y-axis sensor 130 of the strain sensor according to an embodiment of the present disclosure, the volume ratio of the first nanocrystals 121 and 131 to the second nanocrystals 122 and 132 is preferably 28:72. When the strain sensor according to an embodiment of the present disclosure has the volume ratio, the strain sensor may have proper electrical conductivity and high sensitivity.

In addition, in the strain sensor according to an embodiment of the present disclosure, resistivity and gauge factors may be controlled depending on the ratio of the second nanocrystals 122 and 132 included in the X-axis sensor 120 and the Y-axis sensor 130.

More specifically, since the first nanocrystals 121 and 131 included in the X-axis sensor 120 and the Y-axis sensor 130 are used as a metallic material, and the second nanocrystals are used as an insulating material, as the content of the second nanocrystals 122 and 132 used as an insulating material in the X-axis sensor 120 and the Y-axis sensor 130 increases, resistivity and gauge factors are increased, so that the sensitivity of the strain sensor may be increased.

In addition, the diameter of the first nanocrystals 121 and 131 or the second nanocrystals 122 and 132 may be 5 nm to 15 nm.

Preferably, since percolation effect may be increased as difference between the diameter of the first nanocrystals 121 and 131 and the diameter of the second nanocrystals 122 and 132 decreases, when the first nanocrystals 121 and 131 and the second nanocrystals 122 and 132 have the same diameter, percolation effect may be increased, thereby improving the sensitivity of the strain sensor.

According to an embodiment, the first nanocrystals 121 and 131 or the second nanocrystals 122 and 132 included in the X-axis sensor 120 and the Y-axis sensor 130 may include an organic ligand (hereinafter referred to as a second organic ligand) containing 1 to 3 carbon chains or an inorganic ligand.

Preferably, the first nanocrystals 121 and 131 or the second nanocrystals 122 and 132 included in the X-axis sensor 120 and the Y-axis sensor 130 include a long organic ligand (hereinafter referred to as a first organic ligand) containing 8 to 18 carbon chains as an original surface ligand. By surface treatment, the surface ligand of the first nanocrystals 121 and 131 or the second nanocrystals 122 and 132 may be replaced with a second organic ligand having a shorter length than the first organic ligand or with an inorganic ligand. Thus, the first nanocrystals 121 and 131 or the second nanocrystals 122 and 132 may include the second organic ligand or the inorganic ligand as the surface ligand.

For example, in general, when zinc oxide is synthesized, a hydroxyl group is used as a surface ligand. When indium tin oxide is used as the first nanocrystals 121 and 131, and zinc oxide is used as the second nanocrystals 122 and 132, to disperse the first nanocrystals 121 and 131 and the second nanocrystals 122 and 132 in the same solvent (e.g., hexane), a trioctylphosphine oxide (TOPO)-based wet chemical method should be used to synthesize zinc oxide having a hydrophobic surface.

Therefore, a first organic ligand is formed on the surfaces of the first nanocrystals 121 and 131 or the second nanocrystals 122 and 132. In the strain sensor according to an embodiment of the present disclosure, the surface ligand of the first nanocrystals 121 and 131 or the second nanocrystals 122 and 132 is replaced with a second organic ligand or an inorganic ligand. As a result, the length of the ligand is shortened, and the electrical properties of the X-axis sensor 120 and the Y-axis sensor 130 may be improved.

Specifically, when the first organic ligand is the surface ligand of the first nanocrystals 121 and 131 or the second nanocrystals 122 and 132, the distance between the first nanocrystals 121 and 131 and the second nanocrystals 122 and 132 is increased due to the long carbon chains, and thus the first nanocrystals 121 and 131 and the second nanocrystals 122 and 132 are electrically isolated. However, in the strain sensor according to an embodiment of the present disclosure, by replacing the surface ligand of the first nanocrystals 121 and 131 or the second nanocrystals 122 and 132 included in the X-axis sensor 120 and the Y-axis sensor 130 with a second organic ligand having a shorter length than the first ligand or with an inorganic ligand, the distance between the first nanocrystals 121 and 131 and the second nanocrystals 122 and 132 is decreased. As a result, electrons may be easily moved, and metal-insulator transition characteristics may be exhibited.

More specifically, to easily disperse the first nanocrystals 121 and 131 or the second nanocrystals 122 and 132 in a nonpolar solvent, the surfaces of the first nanocrystals 121 and 131 or the second nanocrystals 122 and 132 should be nonpolar. Thus, when a first organic ligand having long carbon chains is added in the preparation of the first nanocrystals 121 and 131 or the second nanocrystals 122 and 132, the first organic ligand having long carbon chains is attached to the surfaces of the first nanocrystals 121 and 131 or the second nanocrystals 122 and 132, which may increase dispersibility in the nonpolar solvent.

However, in the case of the first nanocrystals 121 and 131 or the second nanocrystals 122 and 132 to which the first organic ligand having long carbon chains is attached, it is difficult to transfer electrons from the first nanocrystals 121 and 131 or the second nanocrystals 122 and 132 to the other first nanocrystals 121 and 131 or the other second nanocrystals 122 and 132. Accordingly, by replacing the first organic ligand with a second organic ligand having a shorter ligand length than the first organic ligand or with an inorganic ligand having a shorter ligand length than the second organic ligand, electrical properties may be obtained.

Although the ligand replacement process may be performed in a solution state, there are many restrictions. Thus, in general, the flexible insulating substrate 110 is coated with the first nanocrystals 121 and 131 or the second nanocrystals 122 and 132 dispersed in an inorganic solvent (before ligand replacement), and then a ligand displacement solution containing a second organic ligand or an inorganic ligand dispersed in a polar solvent (e.g., methanol, IPA, or DIW) is sprayed onto the flexible insulating substrate 110 or the flexible insulating substrate 110 is immersed in the ligand displacement solution to perform the ligand replacement process.

Therefore, in the strain sensor according to an embodiment of the present disclosure, the first nanocrystals 121 and 131 having insulating properties (before the ligand displacement process; and including a first organic ligand as a surface ligand) may have conductive properties (after the ligand displacement process; and including a second organic ligand or an inorganic ligand as a surface ligand) through the ligand replacement process, and the second nanocrystals 122 and 132 may have insulating properties before and after the ligand replacement process.

That is, in the strain sensor according to an embodiment of the present disclosure, a second organic ligand or an inorganic ligand is attached to the surfaces of the first nanocrystals 121 and 131 through the ligand replacement process, thereby imparting conductivity to the first nanocrystals 121 and 131.

The first organic ligand may contain 8 to 18 carbon chains. When the first organic ligand contains less than 8 carbon chains, a problem of aggregation of the first nanocrystals 121 and 131 or the second nanocrystals 122 and 132 may occur due to decrease of dispersibility (dispersion stability) in an organic solvent. When the first organic ligand contains more than 18 carbon chains, the ligand length is long enough that no significant change is observed, and therefore this is unnecessary.

The first organic ligands serve to adjust the shape and size of the first nanocrystals 121 and 131 or the second nanocrystals 122 and 132 in the synthesis of the first nanocrystals 121 and 131 or the second nanocrystals 122 and 132, and the first organic ligands surround the first nanocrystals 121 and 131 or the second nanocrystals 122 and 132, which allows the first nanocrystals 121 and 131 or the second nanocrystals 122 and 132 to be dispersed like an ink in an organic solvent. In addition, it is possible to prevent the metal nanoparticles from aggregating and precipitating due to the repulsive force between the first organic ligands.

The first organic ligand may include any one of trioctylphosphine, trioctylphosphine oxide, oleic acid, and oleylamine.

The second organic ligand formed on the surfaces of the first nanocrystals 121 and 131 or the second nanocrystals 122 and 132 may contain 1 to 3 carbon chains. When the second organic ligand contains more than 3 carbon chains, conductivity may be significantly reduced due to excessive increase in ligand length.

The second organic ligand formed on the surfaces of the first nanocrystals 121 and 131 or the second nanocrystals 122 and 132 may include at least one of 3-mercaptopropionic acid (MPA) and 1,2-ethanedithiol (EDT).

The inorganic ligand formed on the surfaces of the first nanocrystals 121 and 131 or the second nanocrystals 122 and 132 may include at least one of sulfide ion ($S^{2-}$), chloride ion ($Cl^{31}$), bromide ion ($Br^-$), thiocyanate ion ($SCN^-$), iodide ion ($I^-$), disulfide ion ($HS^-$), telluride ion ($Te^{2-}$), hydroxide ion ($OH^-$), tetrafluoroborate ion ($BF_4^-$), and hexafluorophosphate ion ($PF_6^-$).

Preferably, as the inorganic ligand formed on the surfaces of the first nanocrystals 121 and 131 or the second nanocrystals 122 and 132, a compound containing at least one of sulfide ion ($S^{2-}$), chloride ion ($Cl^-$), bromide ion ($Br^-$), thiocyanate ion ($SCN^-$), iodide ion ($I^-$), disulfide ion ($HS^-$), telluride ion ($Te^{2-}$), hydroxide ion ($OH^-$), tetrafluoroborate ion ($BF_4^-$), and hexafluorophosphate ion ($PF_6^-$), more preferably, a compound containing sulfide ion ($S^{2-}$), is used.

For example, as the inorganic ligand formed on the surfaces of the first nanocrystals 121 and 131 or the second nanocrystals 122 and 132, the above-mentioned compound in which an anion and a cation are bonded may be used. Sodium sulfide ($Na_2S$) may be used as a compound containing sulfide ion ($S^{2-}$), ammonium chloride ($NH_4Cl$) or tetra-n-butyl ammonium chloride (TBAC) may be used as a compound containing chloride ion ($Cl^-$), tetra-n-butyl ammonium bromide (TBAB) may be used as a compound containing bromide ion ($Br^-$), and ammonium thiocyanate ($NH_4SCN$) may be used as a compound containing thiocyanate ion ($SCN^-$).

In addition, the X-axis sensor 120 and the Y-axis sensor 130 may include cracks C therein. The cracks C may be artificially formed by applying strain to the X-axis sensor 120 and the Y-axis sensor 130 in advance.

The cracks C are gaps between the first nanocrystals 121 and 131 or the second nanocrystals 122 and 132 included in the X-axis sensor 120 and the Y-axis sensor 130, and the cracks C may be formed at the nanometer scale. When the cracks C are formed in the X-axis sensor 120 and the Y-axis sensor 130, change in resistance of the X-axis sensor 120 and the Y-axis sensor 130 due to strain may be increased, and a gauge factor may be increased.

In the strain sensor according to an embodiment of the present disclosure, by including the cracks C in the X-axis sensor 120 and the Y-axis sensor 130, the sensitivity of the strain sensor may be improved, and a multi-axis strain sensor may be fabricated. The multi-axis strain sensor may be applied to various fields such as wearable sensors and electronic skin.

In addition, when the cracks C are artificially formed, the number of charge transfer paths in the X-axis sensor 120 and the Y-axis sensor 130 may be additionally controlled. Accordingly, when strain is applied, a resistance change rate increases, thereby further increasing the sensitivity of the strain sensor.

The cracks C may be formed orthogonal to each other (i.e., +shape) within the X-axis sensor 120 and the Y-axis sensor 130. When the cracks C are formed orthogonal to each other within the X-axis sensor 120 and the Y-axis sensor 130, the electrical and mechanical properties of the strain sensor may be improved, and the strain sensor may detect the strength and direction of strain at the same time.

Specifically, when cracks are formed in the X-axis sensor 120 and the Y-axis sensor 130, since pre-cracks are formed in X-axis and Y-axis directions, orthogonal cracks having an orthogonal shape may be included in all regions of the X-axis sensor 120 and the Y-axis sensor 130.

In addition, in the strain sensor according to an embodiment of the present disclosure, since the X-axis sensor 120 is formed on the Y-axis to sense strain in the X-axis direction, and the Y-axis sensor 130 is formed on the X-axis to sense strain in the Y-axis direction, only cracks in the direction orthogonal to the X-axis (a direction parallel to the X-axis sensor 120) among orthogonal cracks included in the X-axis sensor 120 may affect sensitivity, and only cracks in the direction orthogonal to the Y-axis (a direction parallel to the Y-axis sensor 130) among orthogonal cracks included in the Y-axis sensor 130 may affect sensitivity.

In addition, the cracks C may be formed orthogonal to each other (i.e., +shape) in a portion where the X-axis sensor 120 and the Y-axis sensor 130 are orthogonal to each other, and may exhibit a rectangular shape. With this configuration, the strain sensor may detect the strength and direction of strain at the same time.

The strain sensor according to an embodiment of the present disclosure includes the metal electrode 140 formed on a region of the flexible insulating substrate 110 where the X-axis sensor 120 and the Y-axis sensor 130 are not formed.

The metal electrode 140 may be formed as a thin film. Preferably, the metal electrode 140 may include first and second electrodes. Since current flows into one of the first and second electrodes and current flows out from the other electrode, the first and second electrodes may be spaced apart from each other with the X-axis sensor 120 and the Y-axis sensor 130 interposed therebetween.

As the metal electrode 140, a transparent material having high electrical conductivity may be used. For example, the metal electrode 140 may include at least one of a silver (Ag) nanowire, a copper (Cu) nanowire, an aluminum (Al) nanowire, a gold (Au) nanowire, a platinum (Pt) nanowire, a nickel (Ni) nanowire, a tungsten (W) nanowire, an iron (Fe) nanowire, a carbon nanotube (CNT), and graphene.

Preferably, a silver (Ag) nanowire is used as the metal electrode 140. A silver (Ag) nanowire is a transparent material having high electrical conductivity and may be obtained through a low-cost solution process.

The strain sensor according to an embodiment of the present disclosure includes the encapsulation layer 150 formed on the X-axis sensor 120, the Y-axis sensor 130, and the metal electrode 140.

The encapsulation layer 150 is formed on the upper part of the X-axis sensor 120 and the Y-axis sensor 130 in which cracks are formed, and may prevent reconnection of cracks due to the Poisson effect, thereby increasing the gauge factor of the strain sensor to 3,000 or more.

In the strain sensor according to an embodiment of the present disclosure, the resistance change rate may be adjusted depending on the thickness of the encapsulation layer 150. When the thickness of the encapsulation layer 150 increases, the resistance change rate of the strain sensor increases, thereby improving the sensitivity of the strain sensor.

The thickness of the encapsulation layer 150 may be 700 nm to 10 μm. When the thickness of the encapsulation layer 150 is 700 nm or less, the encapsulation layer 150 becomes too thin to completely cover the cracks C, which causes a problem of reconnection of the cracks C. When the thickness of the encapsulation layer 150 exceeds 10 μm, strain applied to the X-axis sensor 120 and the Y-axis sensor 130 is reduced due to rise of a neutral mechanical plane, which causes decrease in sensitivity.

Any transparent polymer capable of penetrating through the cracks C and being cured therein may be used as the encapsulation layer 150 without limitation. Preferably, the encapsulation layer 150 includes at least one of SU-8, polydimethylsiloxane (PDMS), Ecoflex, poly(methyl methacrylate) (PMMA), and polyimide.

Therefore, in the strain sensor according to an embodiment of the present disclosure, by including the encapsulation layer 150 using a transparent polymer, the physical and chemical durability of the strain sensor may be secured and at the same time, the sensitivity of the strain sensor may be further improved. In addition, a multi-axis strain sensor having high sensitivity may be fabricated and may be used as a wearable sensor capable of measuring blood pressure, speech recognition, motion recognition, and the like.

FIG. 4 is a schematic view showing cracks in an X-axis sensor and a Y-axis sensor of a strain sensor according to an embodiment of the present disclosure.

Referring to FIG. 4, in an X-axis sensor and a Y-axis sensor of the strain sensor according to an embodiment of the present disclosure, first nanocrystals and second nanocrystals are formed in a metal-insulator heterostructure. Cracks are artificially formed in the X-axis sensor and the Y-axis sensor of the strain sensor according to an embodiment of the present disclosure.

FIG. 5 includes drawings for explaining changes of cracks in an X-axis sensor and a Y-axis sensor depending on the encapsulation layer of a strain sensor according to an embodiment of the present disclosure.

In the case of a conventional sensor in which an encapsulation layer is not formed on an X-axis sensor and a Y-axis sensor, although cracks are formed in the X-axis sensor and the Y-axis sensor, cracks are recombined by side compression, and new percolation paths are formed in the X-axis sensor and the Y-axis sensor. Accordingly, there is a problem of restricting improvement in gauge factor of the strain sensor.

A strain sensor should exhibit a dramatic resistance change behavior around a percolation threshold. When an encapsulation layer is not formed, cracks in an X-axis sensor and a Y-axis sensor are recombined, and percolation path-driven in the X-axis sensor and the Y-axis sensor is reduced, thereby reducing sensitivity.

On the other hand, in the strain sensor according to an embodiment of the present disclosure, since an encapsulation layer is formed on the X-axis sensor and the Y-axis sensor of the strain sensor, reconnection of cracks in the transverse direction may be prevented when axial tensile strain is applied.

The X-axis sensor and the Y-axis sensor in which cracks are formed are coated with an encapsulation layer through spin coating, and then soft baking and UV treatment are performed for curing.

FIG. 6 includes images showing the orthogonal cracks of the strain sensor according to an embodiment of the present disclosure, and images showing analysis results using a finite element method (FEM).

Referring to FIG. 6, in the strain sensor according to an embodiment of the present disclosure, the X-axis sensor and the Y-axis sensor are orthogonal to each other to exhibit a cross shape, and orthogonal cracks are included in the cross-shaped portion where the X-axis sensor and the Y-axis sensor intersect.

FIG. 7 is a schematic view for explaining a method of fabricating a strain sensor according to an embodiment of the present disclosure.

Since the method of fabricating a strain sensor according to an embodiment of the present disclosure includes the same components as the strain sensor according to an embodiment of the present disclosure, description of the same components will be omitted.

The method of fabricating a strain sensor according to an embodiment of the present disclosure includes a step of dispersing first nanocrystals and second nanocrystals in a solvent to prepare a sensing solution, a step of performing patterning using the sensing solution to form the X-axis sensor 120 and the Y-axis sensor 130 on a flexible insulating substrate so that the X-axis sensor 120 and the Y-axis sensor 130 are orthogonal to each other (FIGS. 7A to 7E), a step of forming a metal electrode on a region of the flexible insulating substrate where the X-axis sensor 120 and the Y-axis sensor 130 are not formed (FIGS. 7F to 7I), a step of forming cracks in the X-axis sensor 120 and the Y-axis sensor 130 (FIGS. 7J and 7K), and a step of forming an encapsulation layer on the X-axis sensor 120 in which cracks are formed, the Y-axis sensor 130 in which cracks are formed, and the metal electrode (FIG. 7L).

In the method of fabricating a strain sensor according to an embodiment of the present disclosure, the step of dispersing first nanocrystals and second nanocrystals in a solvent to prepare a sensing solution is performed.

First, in the step of dispersing first nanocrystals and second nanocrystals in a solvent to prepare a sensing solution, first nanocrystals and second nanocrystals are respectively mass-synthesized through a solution process performed at a low temperature of 300° C. or less, and the synthesized first and second nanocrystals are dispersed in a solvent.

The volume ratio of the first nanocrystals to the second nanocrystals contained in the sensing solution may be 38 to 18:62 to 82. When the volume ratio of the first nanocrystals to the second nanocrystals exceeds 38:62, due to increase in the volume ratio of the first nanocrystals, electrical conductivity may be improved, but sensitivity may be reduced. When the volume ratio of the second nanocrystals to the first nanocrystals exceeds 18:82, due to increase in the volume ratio of the second nanocrystals, electrical conductivity may be dramatically reduced. As a result, measurement of strain may be difficult, and sensitivity may be excessively increased.

Therefore, in the method of fabricating a strain sensor according to an embodiment of the present disclosure, depending on the volume ratio of the first nanocrystals to the second nanocrystals, the electrical conductivity and sensitivity of the strain sensor may be controlled. For example, when the volume ratio of the first nanocrystals increases, electrical conductivity may be increased, but sensitivity may be decreased. In contrast, when the volume ratio of the second nanocrystals increases, electrical conductivity may be decreased, but sensitivity may be increased. Therefore, in the method of fabricating a strain sensor according to an embodiment of the present disclosure, the volume ratio of the first nanocrystals to the second nanocrystals may be controlled to fabricate a strain sensor having desired electrical conductivity and sensitivity.

In the method of fabricating a strain sensor according to an embodiment of the present disclosure, the volume ratio of the first nanocrystals to the second nanocrystals is preferably 28:72. When the strain sensor has this volume ratio, the strain sensor may have proper electrical conductivity and high sensitivity.

The solvent may include at least one of methane, ethylene, acetylene, benzene, hexane, ethanol, methanol, and propanol.

In the method of fabricating a strain sensor according to an embodiment of the present disclosure, the step of performing patterning using the sensing solution to form the X-axis sensor 120 and the Y-axis sensor 130 on a flexible insulating substrate so that the X-axis sensor 120 and the Y-axis sensor 130 are orthogonal to each other (FIGS. 7A to 7E) is performed.

More specifically, the step of performing patterning (FIGS. 7A to 7E) may include a step of coating the substrate with a first photoresist (FIG. 7B), a step of patterning the first photoresist to form an orthogonal pattern of the X-axis sensor 120 and the Y-axis sensor 130 (FIG. 7C), a step of coating the patterned first photoresist with a sensing solution (FIG. 7D), and a step of lifting-off the first photoresist (FIG. 7E).

In the step of coating the patterned first photoresist with a sensing solution (FIG. 7D), the flexible insulating substrate may be coated with the sensing solution using a solution process. In this case, the solution process may include any one of spin coating, slot-die coating, ink-jet printing, spray coating, and dip coating. Preferably, spin coating is used to coat the flexible insulating substrate with the sensing solution. Spin coating is a method of dropping a predetermined amount of a solution on a substrate and spinning the substrate at a high speed to coat the substrate using centrifugal force applied to the solution.

In addition, the step of performing patterning (FIGS. 7A to 7E) may be performed at a temperature of 60° C. to 150° C. When the step is performed at a temperature below 60° C., the solvent of the photoresist is not removed, and unnecessary portions (regions of the X-axis sensor 120 and the Y-axis sensor 130) may be removed in a post-exposure development step. When the step is performed at a temperature exceeding 150° C., due to high temperature, portions to be removed (portions excluding the X-axis sensor 120 and the Y-axis sensor 130) may not be removed.

Preferably, the step of performing patterning (FIGS. 7A to 7E) is performed at 110° C.

Therefore, in the method of fabricating a strain sensor according to an embodiment of the present disclosure, since the step of performing patterning (FIGS. 7A to 7E) is performed using the solution process under low temperature and atmospheric pressure, processing time may be shortened, and deterioration may be prevented.

According to an embodiment, the step of performing patterning (FIGS. 7A to 7E) may further include a step of replacing the first organic ligand formed on the surfaces of the first nanocrystals and the second nanocrystals with a second organic ligand or an inorganic ligand.

Specifically, after the step of lifting-off (FIG. 7E), the step of replacing may be performed.

In the step of replacing, a ligand displacement solution in which a second organic ligand or an inorganic ligand is dispersed may be sprayed onto the X-axis sensor 120 and the Y-axis sensor 130, or the X-axis sensor 120 and the Y-axis sensor 130 may be immersed in the ligand displacement solution.

The first organic ligand may contain 8 to 18 carbon chains. When the first organic ligand contains less than 8 carbon chains, a problem of aggregation of the first nanocrystals or the second nanocrystals may occur due to decrease of dispersibility (dispersion stability) in an organic solvent. When the first organic ligand contains more than 18 carbon chains, the ligand length is long enough that no significant change is observed, and therefore this is unnecessary.

Preferably, the first organic ligand may include any one of trioctylphosphine, trioctylphosphine oxide, oleic acid, and oleylamine.

The ligand displacement solution may contain a second organic ligand compound or an inorganic ligand compound and a solvent. The second organic ligand compound may contain 1 to 3 carbon chains. When the second organic ligand compound contains more than 3 carbon chains, conductivity may be significantly reduced due to excessive increase in ligand length.

For example, the second organic ligand may include at least one of 3-mercaptopropionic acid (MPA) and 1,2-ethanedithiol (EDT).

A compound containing at least one of sulfide ion ($S^{2-}$), chloride ion ($Cl^-$), bromide ion ($Br^-$), thiocyanate ion ($SCN^-$), iodide ion ($I^-$), disulfide ion ($HS^-$), telluride ion ($Te^{2-}$), hydroxide ion ($OH^-$), tetrafluoroborate ion ($BF_4^-$), and hexafluorophosphate ion ($PF_6^-$) may be used as the inorganic ligand.

Preferably, as the inorganic ligand compound, the above-mentioned compound in which an anion and a cation are bonded may be used. For example, sodium sulfide ($Na_2S$) may be used as a compound containing sulfide ion ($S^{2-}$), ammonium chloride ($NH_4Cl$) or tetra-n-butyl ammonium chloride (TBAC) may be used as a compound containing chloride ion ($Cl^-$), tetra-n-butyl ammonium bromide (TBAB) may be used as a compound containing bromide ion ($Br^-$), and ammonium thiocyanate ($NH_4SCN$) may be used as a compound containing thiocyanate ion ($SCN^-$).

For example, in the X-axis sensor 120 or the Y-axis sensor 130, before replacing the first organic ligand with the inorganic ligand using $N_2S$, the first and second nanocrystals are electrically isolated due to the long distance between the first and second nanocrystals. However, when the first organic ligand is replaced with the inorganic ligand using $N_2S$, the distance between the first and second nanocrystals is decreased, so that the resistance of the first nanocrystals may be reduced while the resistance of the second nanocrystals may be increased.

The second nanocrystals have a wide band gap of 3 eV or more, thus exhibiting low conductivity in the absence of a gate voltage.

According to an embodiment, after the step of replacing is performed, a step of washing the X-axis sensor 120 and the Y-axis sensor 130 with methanol or ethanol may be performed.

In the method of fabricating a strain sensor according to an embodiment of the present disclosure, the step of forming a metal electrode (FIGS. 7F to 7I) is performed.

Preferably, the step of forming a metal electrode (FIGS. 7F to 7I) may include a step of coating the substrate on which the X-axis sensor 120 and the Y-axis sensor 130 are formed with a second photoresist (FIG. 7F), a step of patterning the second photoresist to form a pattern corresponding to the metal electrode (FIG. 7G), a step of coating the patterned second photoresist with the metal electrode (FIG. 7H), and a step of lifting-off the second photoresist (FIG. 7I).

In the step of coating the patterned second photoresist with the metal electrode (FIG. 7H), the patterned second photoresist may be coated using a solution process. In this case, the solution process may include any one of spin coating, slot-die coating, ink-jet printing, spray coating, and dip coating. Preferably, spin coating is used to coat the patterned second photoresist. Spin coating is a method of dropping a predetermined amount of a solution on a substrate and spinning the substrate at a high speed to coat the substrate using centrifugal force applied to the solution.

In addition, the step of forming a metal electrode (FIGS. 7F to 7I) may be performed at a temperature of 60° C. to 150° C. When the step of forming a metal electrode is performed at a temperature below 60° C., the solvent of the photoresist is not removed, and an unnecessary portion (a portion of the metal electrode) may be removed in a post-exposure development step. When the step is performed at a temperature exceeding 150° C., due to high temperature, portions to be removed (portions excluding the metal electrode) may not be removed.

Preferably, the step of forming a metal electrode (FIGS. 7F to 7I) is performed at 110° C.

Therefore, in the method of fabricating a strain sensor according to an embodiment of the present disclosure, since the step of forming a metal electrode (FIGS. 7F to 7I) is performed using a solution process under low temperature and atmospheric pressure, processing time may be shortened, and deterioration may be prevented.

Specifically, in the method of fabricating a strain sensor according to an embodiment of the present disclosure, since all processes are performed at a temperature of 60° C. to 150° C., a flexible insulating substrate such as PET may be prevented from being thermally deformed at a high temperature. In addition, since all processes are performed using a solution process such as spin coating or a roll-to-roll process, formation of a vacuum atmosphere is not required, and thus process costs may be reduced.

In the method of fabricating a strain sensor according to an embodiment of the present disclosure, the step of forming cracks (FIGS. 7J and 7K) is performed.

The step of forming cracks (FIGS. 7J and 7K) may be performed by bending the flexible insulating substrate, on which the X-axis sensor 120, the Y-axis sensor 130, and the metal electrode are formed, one or more times in the X-axis direction and the Y-axis direction, respectively.

However, a method of forming cracks and the size of cracks are not particularly limited.

When cracks are formed in the X-axis sensor 120 and the Y-axis sensor 130, although resistance slightly increases, the resistance of a sensor according to the X-axis sensor 120 and the Y-axis sensor 130 is greatly changed, increasing gauge factor.

In the method of fabricating a strain sensor according to an embodiment of the present disclosure, the step of forming an encapsulation layer (FIG. 7L) is performed.

The step of forming an encapsulation layer (FIG. 7L) may include a step of coating the flexible insulating substrate including the X-axis sensor 120 in which cracks are formed, the Y-axis sensor 130 in which cracks are formed, and the metal electrode with an encapsulation solution for forming an encapsulation layer, a step of soft-baking the encapsulation solution, and a step of UV-curing the soft-baked encapsulation solution.

An undiluted solution may be used as the encapsulation solution, and spin coating may be used to perform coating.

The X-axis sensor 120 and the Y-axis sensor 130 may have a metal-insulator heterostructure.

Therefore, in the method of fabricating a strain sensor according to an embodiment of the present disclosure, since all processes are performed using a solution process at room temperature (20° C. to 30° C.) and under atmospheric pressure (1 atm), production costs may be reduced, and mass-production becomes possible.

Fabrication Example

Indium tin oxide nanoparticles having a diameter of 7 nm and zinc oxide nanoparticles having a diameter of 11 nm were mas-synthesized at a temperature of 300° C. (low temperature). The synthesized indium tin oxide nanoparticles and the synthesized zinc oxide nanoparticles were dispersed in hexane as a solvent (50 mg of indium tin oxide+100 mg of zinc oxide per 1 ml of hexane) in a volume ratio of indium tin oxide to zinc oxide of 70:30, 44:56, or 28:72 to prepare sensing solutions.

For simultaneously sensing the X-axis and the Y-axis, the X-axis sensor and the Y-axis sensor were patterned on a PET substrate in a cross shape using photolithography and lift-off using a sensing solution, and then a conventional long first organic ligand of trioctylphosphine oxide (TOPO) (containing 8 carbon chains) was replaced with a short inorganic ligand of sodium sulfide ($Na_2S$).

Thereafter, a transparent metal electrode of a silver nanowire was formed using photolithography and lift-off, and then artificial cracks were formed in the orthogonal direction in the X-axis sensor and the Y-axis sensor.

Finally, the X-axis sensor, the Y-axis sensor, and the metal electrode were coated with SU-8 using spin coating to form an SU-8 layer having a thickness of 700 nm or 10 μm, and then soft baking and UV treatment were performed to form an encapsulation layer. In addition, the encapsulation layer was coated with SU-8 at a speed of 3,000 rpm for 30 s, and then pre-baking was performed at 65° C. for 1 minute and at 95° C. for 5 minutes, followed by light exposure for 60 seconds.

In photolithography described above, photoresist coating was performed at 1,000 rpm for 30 seconds, pre-baking was performed at 110° C. for 2 minutes, light exposure was performed for 11 seconds, development was performed for 90 seconds, the X-axis sensor, the Y-axis sensor, and the metal electrode were coated, and then lift-off was performed using acetone.

GXR 601 was used as a photoresist used in photolithography, and photoresist coating was performed using spin coating equipment. MIF 300K and acetone were used as a developer and a lift-off solution, respectively. Exposure time and develop time were adjusted to optimize the process.

FIG. 8 is a graph showing the resistivity of the X-axis sensor or the Y-axis sensor of the strain sensor according to an embodiment of the present disclosure depending on the ratio of the second nanocrystals.

In the X-axis sensor or the Y-axis sensor, a first organic ligand was replaced with an inorganic ligand using $N_2S$, and then the resistivity of the X-axis sensor or the Y-axis sensor depending on the ratio of the second nanocrystals was measured. The obtained results are shown in FIG. 8.

Referring to FIG. 8, in the X-axis sensor or the Y-axis sensor of the strain sensor according to an embodiment of the present disclosure, when the ratio of the second nanocrystals is 30%, a resistance value is 339±50 Ω·cm. When the ratio of the second nanocrystals is 56%, a resistance value is 1.5±0.3 kΩ·cm. When the ratio of the second nanocrystals is 72%, a resistance value is 67±30 kΩ·cm. Based on these results, it can be seen that the X-axis sensor or the Y-axis sensor represents an intermediate resistance.

In particular, it can be seen that, when the second nanocrystals are contained in a ratio of 72% or more, the resistivity of the X-axis sensor or the Y-axis sensor of the strain sensor according to an embodiment of the present disclosure increases dramatically, and at a ratio of 72% or more, the X-axis sensor or the Y-axis sensor is located near the metal-insulator transition threshold.

FIG. 9 is a graph showing current-voltage properties according to bending states before crack formation (black line) and after crack formation (red line) in an X-axis sensor or a Y-axis sensor (pure ITO NC) including only first nanocrystals under a strain of 0% (dotted line) or a strain of 0.2% (solid line) and showing current-voltage properties according to bending states before crack formation (black line) and after crack formation (red line) in the X-axis sensor or the Y-axis sensor (72% ZnO NC hybrid) of the strain sensor according to an embodiment of the present disclosure, and FIG. 10 is a graph showing gauge factors depending on the ratios of the second nanocrystals before crack formation (w/o cracks) and after crack formation (w/cracks) in the X-axis sensor or the Y-axis sensor of the strain sensor according to an embodiment of the present disclosure.

Referring to FIGS. 9 and 10, it can be seen that, under a strain of 0.2% (solid line), the resistance change of an X-axis sensor or a Y-axis sensor (pure ITO NC) including only first nanocrystals is 2.8%, and the gauge factor is 13.8.

In addition, when the ratio of the second nanocrystals is 30%, the gauge factor is 35.6. When the ratio of the second nanocrystals is 56%, the gauge factor is 47.6. When the ratio of the second nanocrystals is 72%, the gauge factor is 66.0. Based on these results, it can be seen that the gauge factor gradually increases as the ratio of the second nanocrystals increases.

The average gauge factor of an X-axis sensor or a Y-axis sensor (pure ITO NC) including only first nanocrystals is 14.0±1.2. When the ratio of the second nanocrystals is 30%, the average gauge factor is 30.7±5.1. When the ratio of the second nanocrystals is 56%, the average gauge factor is 53.0±7.2. When the ratio of the second nanocrystals is 72%, the average gauge factor is 70.8±12.9.

In addition, when a pre-strain of 2% is applied to an X-axis sensor or a Y-axis sensor and cracks are formed in the X-axis sensor or the Y-axis sensor, the average gauge factor of the X-axis sensor or the Y-axis sensor (pure ITO NC) including only first nanocrystals is 25.9±3.4. When the ratio of the second nanocrystals is 30%, the average gauge factor is 83.7±5.9. When the ratio of the second nanocrystals is 56%, the average gauge factor is 178.8±20.0. When the ratio of the second nanocrystals is 72%, the average gauge factor is 420.4±40.6.

Therefore, it can be seen that, when cracks are formed in the X-axis sensor and the Y-axis sensor, the sensitivity of the strain sensor is improved.

FIG. 11 is a graph showing the resistance change cycles, under a strain of 0.2%, of an X-axis sensor or a Y-axis sensor (pure ITO NC) including only first nanocrystals, the X-axis sensor or the Y-axis sensor (56% ZnO NC hybrid) including 56% second nanocrystals of the strain sensor according to an embodiment of the present disclosure, and the X-axis sensor or the Y-axis sensor (72% ZnO NC hybrid) including 72% second nanocrystals of the strain sensor according to an embodiment of the present disclosure.

Referring to FIG. 11, it can be seen that, as the ratio of an insulating component of the second nanocrystals in the X-axis sensor or the Y-axis sensor increases, the sensitivity of the X-axis sensor or the Y-axis sensor increases together with cracks, and when the second nanocrystals are included in a ratio of 72%, the strain sensor exhibits a high sensitivity of 482.

FIG. 12 is a graph showing resistance change depending on the strain cycles, under a strain of 0.2%, of a strain sensor (no SU-8) not including an encapsulation layer and a strain sensor according to an embodiment of the present disclosure including an encapsulation layer (700 nm SU-8) having a thickness of 700 nm or an encapsulation layer (10 μm SU-8) having a thickness of 10 μm, and FIG. 13 is a graph showing resistance change depending on the applied strain of a strain sensor (no SU-8) not including an encapsulation layer and a strain sensor according to an embodiment of the present disclosure including an encapsulation layer (700 nm SU-8) having a thickness of 700 nm or an encapsulation layer (10 μm SU-8) having a thickness of 10 μm.

Referring to FIGS. 12 and 13, as the thickness of the encapsulation layer of the strain sensor according to an embodiment of the present disclosure increases, the sensitivity of the strain sensor according to an embodiment of the present disclosure increases together with cracks. The gauge factor of the strain sensor according to an embodiment of the present disclosure including an encapsulation layer (10 μm SU-8) having a thickness of 10 μm is 3,358, which is the highest value.

In addition, stable resistance change is observed during multiple strain cycle tests under a strain of 0.2%. The strain sensor according to an embodiment of the present disclosure including an encapsulation layer having a thickness of 700 nm exhibits linear resistance change within a strain range of 0% to 1%, and the strain sensor according to an embodiment of the present disclosure including an encapsulation layer having a thickness of 10 μm maintains basic resistance and high sensitivity in strain cycle tests performed over 1,400 times and exhibits excellent durability.

FIG. 14 is a graph showing resistance change according to deionized water (DIW), ethanol (ETOH), hydrochloric acid (HCl), or potassium hydroxide (KOH) treatment in a strain sensor (no SU-8) not including an encapsulation layer and a strain sensor (SU-8) according to an embodiment of the present disclosure including an encapsulation layer having a thickness of 10 μm.

Referring to FIG. 14, the strain sensor not including an encapsulation layer is susceptible to environmental changes. Accordingly, when the strain sensor not including an encapsulation layer is treated with each solution, the strain sensor exhibits a large resistance change of 40% or more. In contrast, when the strain sensor (SU-8) according to an embodiment of the present disclosure including an encapsulation layer having a thickness of 10 μm is treated with each solution, the strain sensor (SU-8) exhibits negligible resistance change. These results indicate that the strain sensor (SU-8) has excellent durability and stability.

FIG. 15 is a graph showing resistance change according to increase in strain, when the angle (θ) between an X-axis and the direction of an applied strain is 0°, in the strain sensor according to an embodiment of the present disclosure, and FIG. 16 is an image showing analysis results using a finite element method (FEM) that show the strain distribution of the strain sensor according to an embodiment of the present disclosure including orthogonal cracks.

Referring to FIGS. 15 and 16, it can be seen that the resistance of the X-axis sensor increases in proportion to the applied strain, and the maximum effective gauge factor reaches 500 in a strain range of 0.2% to 1%.

On the other hand, it can be seen that, since the Y-axis sensor exhibits negligible resistance change for the applied strain, the effective gauge factor is as low as 11.

In addition, cracks parallel to strain applied force are mainly concentrated, and the strain of cracks perpendicular to the X-axis sensor is concentrated. As a result, resistance change is observed, but resistance change of the Y-axis sensor is negligible.

FIG. 17 is a graph showing resistance change according to increase in strain, when the angle (θ) between an X-axis and the direction of an applied strain is 45°, in the strain sensor according to an embodiment of the present disclosure, and FIG. 18 is an image showing analysis results using a finite element method (FEM) that show the strain distribution of the strain sensor according to an embodiment of the present disclosure including orthogonal cracks.

Referring to FIGS. 17 and 18, it can be seen that the X-axis sensor and the Y-axis sensor exhibit similar resistance change as strain increases, and an effective gauge factor of about 330 is derived.

In addition, it can be seen that cracks parallel to strain applied force are mainly concentrated, and the X-axis sensor and the Y-axis sensor exhibit similar resistance change, indicating that strain is uniformly distributed in orthogonal cracks.

FIG. 19 is a graph showing the resistance change cycles of the X-axis sensor of the strain sensor according to an embodiment of the present disclosure when the angle (θ) between an X-axis and the direction of an applied strain is 0°, 30°, 45°, 60°, or 90°, and FIG. 20 is a graph showing gauge factors according to angular functions of the X-axis in the X-axis sensor and the Y-axis sensor having a cross-shaped pattern of the strain sensor according to an embodiment of the present disclosure.

Referring to FIGS. 19 and 20, it can be seen that the X-axis sensor and the Y-axis sensor exhibit reliable resistance change in strain cycle tests for various directions from θ=0° to θ=90°.

In addition, in the X-axis sensor and the Y-axis sensor, as the angle from the X-axis increases, the effective gauge factors of the X-axis sensor are 528 (θ=0°, Gx), 421 (θ=30°), 319 (θ=45°), 239 (θ=60°), and 10 (θ=90°), and the effective gauge factors of the Y-axis sensor are 8.3 (θ=0°), 240 (θ=30°), 314 (θ=45°), 435 (θ=60°), and 520 (θ=90°, Gy).

In addition, referring to FIG. 20, considering that the test results (solid line) of the strain sensor according to an embodiment of the present disclosure coincide with the simulation data (dotted line), it can be seen that the strain sensor according to an embodiment of the present disclosure is a transparent multi-axis sensor having excellent sensitivity and stability.

FIG. 21 is a graph showing real-time human pulse monitoring of the strain sensor according to an embodiment of the present disclosure applied to the wrist.

Referring to FIG. 21, the strain sensor according to an embodiment of the present disclosure senses percussion (P) waves, tidal (T) waves, and diastolic (D) waves. This results suggest that the strain sensor may be used as a wearable medical device.

FIG. 22 is a graph showing change in the sound signal of the strain sensor according to an embodiment of the present disclosure attached to a user's neck when the user pronounces "strain" and "sensor" twice.

Referring to FIG. 22, when a user pronounces "strain" and "sensor" twice, the strain sensor according to an embodiment of the present disclosure distinguishes the words by sensing the unique pattern of each word. This results suggest that the strain sensor may be applied to a human-machine interface technology.

FIGS. 23 and 24 are graphs showing the resistance change of the strain sensor according to an embodiment of the present disclosure attached to a user's forehead when the user is surprised or in pain.

Referring to FIGS. 23 and 24, the sensor is deformed by the curvature of the forehead. When the surface of the forehead increases due to surprise, the strain sensor according to an embodiment of the present disclosure is spread to reduce strain applied to the strain sensor, resulting in decrease in resistance. When the curvature of the forehead increases due to pain, strain applied to the strain sensor according to an embodiment of the present disclosure increases significantly, resulting in increase in resistance.

FIGS. 25 and 26 are graphs showing the resistance change of the strain sensor according to an embodiment of the present disclosure attached near the mouth of a user when the user is sullen or smiling.

Referring to FIGS. 25 and 26, in the case of the strain sensor according to an embodiment of the present disclosure attached near the mouth, when a user is sullen, since the vicinity of the mouth is extended, the strain sensor is spread to reduce the strain applied to the strain sensor, resulting in decrease in resistance. When a user smiles, the curvature near the mouth increases to increase the strain applied to the strain sensor, resulting in increase in resistance.

FIG. 27 includes images showing the strain sensor according to an embodiment of the present disclosure attached to a user's wrist, FIG. 28 is a graph showing resistance change according to uniaxial motion in the strain sensor according to an embodiment of the present disclosure, and FIG. 29 is a graph showing resistance change according to multi-axis motion in the strain sensor according to an embodiment of the present disclosure.

Referring to FIGS. 27 to 29, when the wrist is bent in the Y-axis (the first direction), only the resistance of the Y-axis sensor increases significantly, and the X-axis sensor exhibits negligible resistance change.

On the other hand, when the wrist is bent in the diagonal direction, strain is detected in both the X-axis sensor and the Y-axis sensor. When strain is applied to the strain sensor according to an embodiment of the present disclosure in multiple axes, the strain sensor clearly exhibits resistance change. These results suggest that the strain sensor has excellent practicality, sensitivity, and selectivity.

According to an embodiment of the present disclosure, a strain sensor of the present disclosure includes an X-axis sensor and a Y-axis sensor including a metal-insulator heterostructure composed of first nanocrystals used as a metallic material and second nanocrystals used as an insulating material. With this configuration, the sensitivity of the strain sensor can be improved using percolation.

According to an embodiment of the present disclosure, the strain sensor includes an X-axis sensor and a Y-axis sensor including transparent first nanocrystals and transparent second nanocrystals. With this configuration, transparency of the strain sensor can be secured, and the strain sensor can perform multi-axis sensing.

According to an embodiment of the present disclosure, by forming an encapsulation layer on an X-axis sensor and a Y-axis sensor each including cracks, the physical and chemical stability of the strain sensor can be improved. In addition, crack reconnection in the orthogonal direction due to the Poisson effect can be prevented, thereby significantly improving the sensitivity of the strain sensor.

According to an embodiment of the present disclosure, by overcoming the limitations of conventional nanoparticle-based strain sensors, a strain sensor having improved aesthetics through securing transparency and having a gauge factor (the sensitivity of the strain sensor) of 3,000 and a method of fabricating the strain sensor can be provided.

Although the present disclosure has been described through limited examples and figures, the present disclosure is not intended to be limited to the examples. Those skilled in the art will appreciate that various modifications, additions, and substitutions are possible, without departing from the scope and spirit of the disclosure. Therefore, the scope of the present disclosure should not be limited by the embodiments, but should be determined by the following claims and equivalents to the following claims.

What is claimed is:

1. A strain sensor, comprising:
an X-axis sensor formed on a flexible insulating substrate and responsible for sensing X-axis strain;
a Y-axis sensor formed on the flexible insulating substrate to be orthogonal to the X-axis sensor and responsible for sensing Y-axis strain;
a metal electrode formed on a region of the flexible insulating substrate where the X-axis sensor and the Y-axis sensor are not formed; and
an encapsulation layer formed on the X-axis sensor, the Y-axis sensor, and the metal electrode,
wherein the X-axis sensor and the Y-axis sensor have a metal-insulator heterostructure, and
wherein the X-axis sensor and the Y-axis sensor each comprise cracks therein.

2. The strain sensor according to claim 1, wherein the metal-insulator heterostructure comprises first nanocrystals used as a metallic material and second nanocrystals used as an insulating material.

3. The strain sensor according to claim 2, wherein a volume ratio of the first nanocrystals to the second nanocrystals is 38 to 18:62 to 82.

4. The strain sensor according to claim 2, wherein the first nanocrystals or the second nanocrystals have a diameter of 5 nm to 15 nm.

5. The strain sensor according to claim 2, wherein the first nanocrystals or the second nanocrystals comprise an organic ligand containing 1 to 3 carbon chains or an inorganic ligand.

6. The strain sensor according to claim 5, wherein the organic ligand containing 1 to 3 carbon chains comprises at least one of 3-mercaptopropionic acid (MPA) and 1,2-ethanedithiol (EDT).

7. The strain sensor according to claim 5, wherein the inorganic ligand comprises at least one of sulfide ion ($S^{2-}$), chloride ion ($Cl^-$), bromide ion ($Br^-$), thiocyanate ion ($SCN^-$), iodide ion ($I^-$), disulfide ion ($HS^-$), telluride ion ($Te^{2-}$), hydroxide ion ($OH^-$), tetrafluoroborate ion ($BF_4^-$), and hexafluorophosphate ion ($PF_6^-$).

8. The strain sensor according to claim 1, wherein the encapsulation layer comprises at least one of SU-8, polydimethylsiloxane (PDMS), Ecoflex, poly(methyl methacrylate) (PMMA), and polyimide.

9. The strain sensor according to claim 1, wherein the cracks are formed in the X-axis sensor and the Y-axis sensor so that the cracks are orthogonal to each other.

10. The strain sensor according to claim 2, wherein the first nanocrystals comprise at least one of indium tin oxide (ITO), fluorine-doped tin oxide (FTO), and aluminum-doped zinc oxide (AZO).

11. The strain sensor according to claim 2, wherein the second nanocrystals comprise at least one of zinc oxide (ZnO), silicon oxide ($SiO_2$), and aluminum oxide ($Al_2O_3$).

12. The strain sensor according to claim 1, wherein the metal electrode comprises at least one of a silver (Ag) nanowire, a copper (Cu) nanowire, an aluminum (Al) nanowire, a gold (Au) nanowire, a platinum (Pt) nanowire, a nickel (Ni) nanowire, a tungsten (W) nanowire, an iron (Fe) nanowire, a carbon nanotube (CNT), and graphene.

13. A strain sensor, comprising:
an X-axis sensor formed on a flexible insulating substrate and responsible for sensing X-axis strain;
a Y-axis sensor formed on the flexible insulating substrate to be orthogonal to the X-axis sensor and responsible for sensing Y-axis strain;
a metal electrode formed on a region of the flexible insulating substrate where the X-axis sensor and the Y-axis sensor are not formed; and
an encapsulation layer formed on the X-axis sensor, the Y-axis sensor, and the metal electrode,
wherein the X-axis sensor and the Y-axis sensor have a metal-insulator heterostructure, and
wherein the metal electrode comprises at least one of a silver (Ag) nanowire, a copper (Cu) nanowire, an aluminum (Al) nanowire, a gold (Au) nanowire, a platinum (Pt) nanowire, a nickel (Ni) nanowire, a tungsten (W) nanowire, an iron (Fe) nanowire, a carbon nanotube (CNT), and graphene.

14. A method of fabricating a strain sensor, comprising:
dispersing first nanocrystals and second nanocrystals in a solvent to prepare a sensing solution;
performing patterning using the sensing solution to form an X-axis sensor and a Y-axis sensor on a flexible insulating substrate so that the X-axis sensor and the Y-axis sensor are orthogonal to each other;
forming a metal electrode on a region of the flexible insulating substrate where the X-axis sensor and the Y-axis sensor are not formed;
forming cracks in the X-axis sensor and the Y-axis sensor; and
forming an encapsulation layer on the X-axis sensor in which cracks are formed, the Y-axis sensor in which cracks are formed, and the metal electrode.

15. The method according to claim 14, wherein the X-axis sensor and the Y-axis sensor have a metal-insulator heterostructure.

16. The method according to claim 14, wherein a volume ratio of the first nanocrystals to the second nanocrystals is 38 to 18:62 to 82.

17. The method according to claim 14, wherein the performing further comprises replacing a first organic ligand formed on surfaces of the first nanocrystals and the second nanocrystals with a second organic ligand or an inorganic ligand.

18. The method according to claim 17, wherein the first organic ligand contains 8 to 18 carbon chains.

19. The method according to claim 17, wherein the second organic ligand contains 1 to 3 carbon chains.

20. The method according to claim 17, wherein the inorganic ligand comprises at least one of sulfide ion ($S^{2-}$), chloride ion ($Cl^-$), bromide ion ($Br^-$), thiocyanate ion ($SCN^-$), iodide ion ($I^-$), disulfide ion ($HS^-$), telluride ion ($Te^{2-}$), hydroxide ion ($OH^-$), tetrafluoroborate ion ($BF_4^-$), and hexafluorophosphate ion ($PF_6^-$).

* * * * *